United States Patent
Wasnik et al.

(10) Patent No.: US 12,376,011 B2
(45) Date of Patent: Jul. 29, 2025

(54) DETECTING OF SLEEPING CELL IN A MOBILE NETWORK

(71) Applicant: RAKUTEN SYMPHONY, INC., Tokyo (JP)

(72) Inventors: Pankaj Wasnik, Karnataka (IN); Uttam Kumar, New Delhi (IN); Shashank Chandrashekhar, Karnataka (IN); Atul Deshpande, Karnataka (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 366 days.

(21) Appl. No.: 17/623,582

(22) PCT Filed: Jun. 4, 2021

(86) PCT No.: PCT/IB2021/054894
§ 371 (c)(1),
(2) Date: Dec. 28, 2021

(87) PCT Pub. No.: WO2022/013635
PCT Pub. Date: Jan. 20, 2022

(65) Prior Publication Data
US 2024/0031921 A1    Jan. 25, 2024

Related U.S. Application Data

(60) Provisional application No. 63/052,911, filed on Jul. 16, 2020.

(51) Int. Cl.
*H04W 48/16* (2009.01)
*H04W 24/08* (2009.01)

(52) U.S. Cl.
CPC .......... *H04W 48/16* (2013.01); *H04W 24/08* (2013.01)

(58) Field of Classification Search
None
See application file for complete search history.

(56) References Cited

U.S. PATENT DOCUMENTS

2020/0084087 A1\* 3/2020 Sharma ................. H04W 24/08
2020/0097879 A1\* 3/2020 Venkata ................. G06N 20/00
(Continued)

FOREIGN PATENT DOCUMENTS

CN            11148142 A        5/2020

OTHER PUBLICATIONS

English translation of CN 111148142 A—Li et al. May 12, 2020; Sleeping Cell Detecting Method based on the Abnormal Detection and Integrated Learning in Mobile Communication Network (Year: 2020).\*

(Continued)

*Primary Examiner* — Saumit Shah
(74) *Attorney, Agent, or Firm* — HAUPTMAN HAM, LLP

(57) ABSTRACT

A method includes collecting data related to a key performance indicator (KPI) for a cell in a mobile network. The method includes aggregating the collected data for the KPI into a plurality of groups, wherein a first group of the plurality of groups comprises values of the KPI during a time period in a first day, a second group of the plurality of groups comprises values of the KPI during the time period in a second day preceding the first day, and a third group of the plurality of groups comprises values of the KPI during the time period in a third day preceding the second day. The method includes determining whether the cell is a sleeping cell based on a comparison of the first, second and third groups. The method includes labelling the cell as sleeping in response to a determination that the cell is sleeping.

9 Claims, 11 Drawing Sheets

(56) References Cited

U.S. PATENT DOCUMENTS

| | | | |
|---|---|---|---|
| 2020/0213343 A1* | 7/2020 | Bharrat | G06N 3/045 |
| 2020/0252944 A1* | 8/2020 | Rajendran | H04W 52/16 |
| 2021/0168638 A1* | 6/2021 | Ickin | H04L 41/147 |
| 2022/0012627 A1* | 1/2022 | Arora | G06F 9/4856 |
| 2022/0330053 A1* | 10/2022 | Savela | H04W 24/08 |
| 2023/0107505 A1* | 4/2023 | Bunel | G06N 3/084 |
| | | | 382/128 |
| 2023/0216737 A1* | 7/2023 | Borsos | H04L 41/0813 |
| | | | 709/221 |
| 2023/0269387 A1* | 8/2023 | Cricrì | G06N 3/0455 |
| | | | 375/240.03 |

OTHER PUBLICATIONS

Written Opinion in PCT Application No. PCT/IB2021/054894, mailed Sep. 7, 2021, 4pp.

* cited by examiner

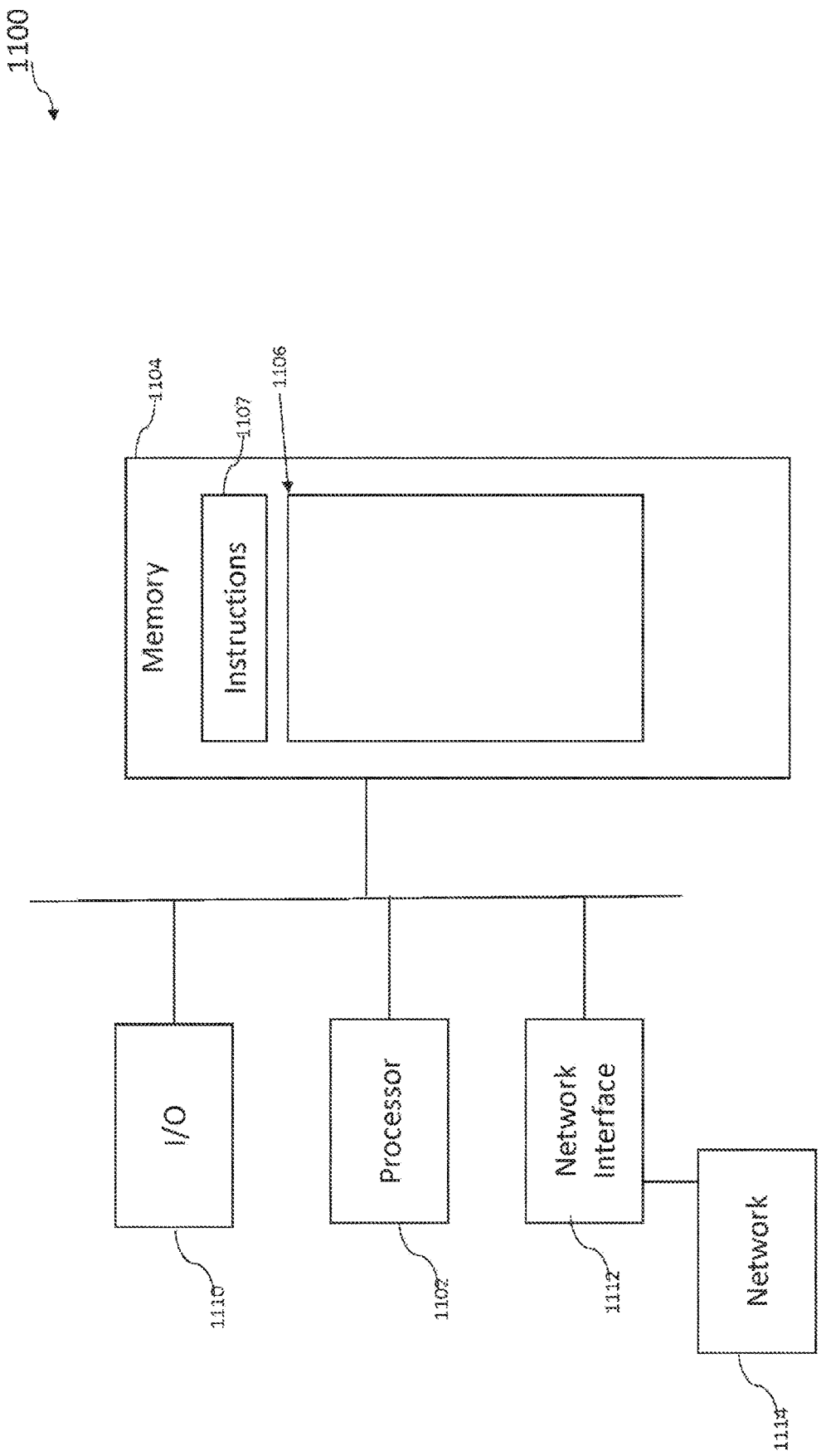

DETECTING OF SLEEPING CELL IN A MOBILE NETWORK

RELATED APPLICATIONS

This application is a National Stage of PCT international application No. PCT/IB2021/054894 filed on Jun. 4, 2021, which claims priority to U.S. provisional application No. 63/052,911 filed on Jul. 16, 2020.

BACKGROUND

Mobile networks use wireless communication to transfer information to and from users. Mobile networks use cells to provide connectivity for the users within geographic areas around the corresponding cell. As coverage areas for mobile networks increase, the number of cells also increases. In addition, the use of new generation mobile networks, e.g., Long Term Evolution (LTE), Fifth Generation (5G), increases the number of cells within the network in order to provide service to different users having terminal devices using operating system from different generations. As a result, the number of cells within mobile networks are increasing rapidly.

In order for a user to connect to the mobile network through the cell, the terminal device exchanges messages with the cell for authentication and establishing a connection. When the cell is unable to receive or transmit messages to the terminal device, the cell is unable to establish new connections. In some instances, the inability to generate new connections results in customer dissatisfaction and a loss of revenue for the network operator.

In some instances, a cell that is unable to establish new connections is easy to detect as a result of a power outage or through the generation of a fault alert by the cell or the network. However, in some instances, a cell appears to be working properly to the system operator but is still unable to establish new connections. This type of cell is called a sleeping cell. A sleeping cell has a fault that reduces or prevents performance of normal functions, such as establishing new connections; however, the fault fails to generate an alarm and is hidden from the network operator. In some instances, complaints from users are the first indication that a cell is sleeping because the fault does not generate an alarm. In some instances, manual checking of the cell is used to determine whether the cell is sleeping. In some instances, in addition to failing to establish new connections, a sleeping cell will also drop connections to terminal devices that were previously connected to the cell.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 11 is a schematic diagram of a system for implementing detection or monitoring of a sleeping cell in accordance with some embodiments.

DETAILED DESCRIPTION

Figure 1:
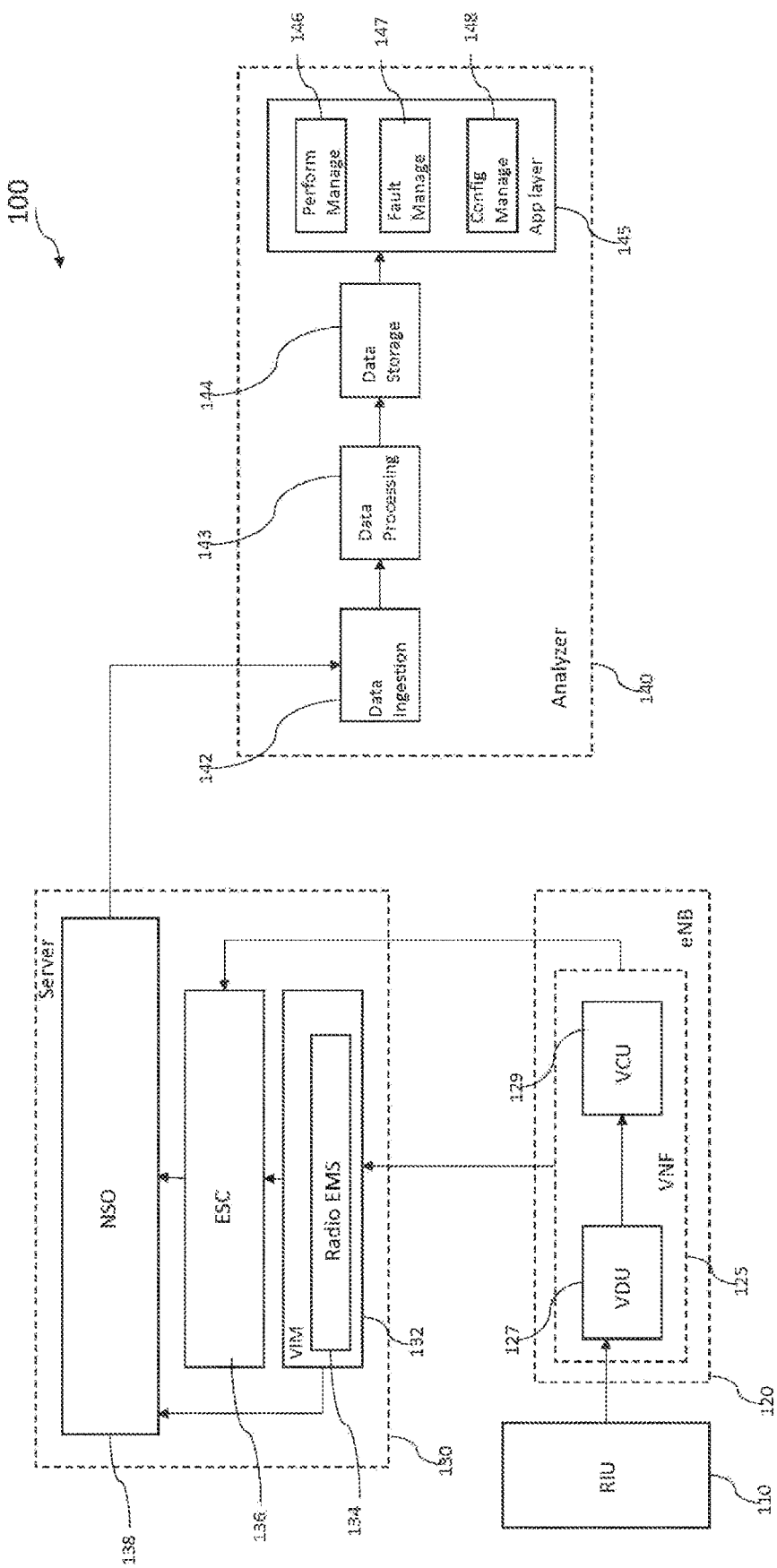
FIG. 1 is a schematic diagram of a data collection system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the collection or analysis of data by a specific component is merely an example of a component capable of implementing the collection or analysis and is not intended to limit the scope of this disclosure. In addition, the present disclosure may repeat reference numerals and/or letters in the various examples. This repetition is for the purpose of simplicity and clarity and does not in itself dictate a relationship between the various embodiments and/or configurations discussed.

Determining whether a cell in a mobile network is a sleeping cell is often difficult. In some instances, manual testing or user complaints are the first indication that a cell may be sleeping. Manual testing involves an operator to travel to different cell locations to determine whether the cell is functioning properly. As a geographic coverage area of a mobile network grows and supports multiple generations of technology, the number of cells within the mobile network increases. Manual testing of all of these cells is expense and time consuming. Waiting on user complaints to identify a sleeping cell reduces customer satisfaction and can lead to loss of users for a network operator.

The current disclosure utilizes key performance indicators (KPIs) to identify whether a cell is in a sleeping state. A sleeping state is where a cell is not functioning properly, such as failing to establish new connections with terminal devices, despite failing to generate an alert to notify the network operator of the problem. KPI data is collectable remotely avoiding the use of manual testing. This increases the efficiency of identifying sleeping cells. Using KPIs to identify sleeping cells quickly also reduces the impact on users of the mobile network, which maintains or increases customer satisfaction and helps to prevent loss of customers.

In some embodiments, zero radio resource control (Zero RRC) is a KPI used to determine whether a cell is sleeping. In some embodiments, cyclic redundancy check (CRC) is a KPI used to determine whether a cell is sleeping. In some embodiments, system information block (SIB) is a KPI used to determine whether a cell is sleeping. In some embodiments, multiple KPIs, such as a combination of Zero RRC, CRC and SIB, are used in determining whether a cell is sleeping. Zero RRC indicates whether the cell is able to establish connections with terminal devices and release connections with terminal devices. CRC indicates whether there are accidental changes in data entering and exiting the cell. SIB indicates whether access to the mobile network is permitted.

A cell is identifiable as sleeping cells based on a detected change in the performance of the cell over time. In some embodiments, the cell is identified as a sleeping cell in response to change in performance of the cell within a time period of a week. In some embodiments, a different time period is used to determine a change in the performance of the cell. Performance of the cell is determined based on comparison of KPIs with threshold values. In some embodiments, the threshold values are determined empirically. In some embodiments, the threshold values are set by a network operator.

Once threshold values are determined a machine learning system is able to capture KPIs and compare the KPIs to the threshold values to automatically identify whether a cell is sleeping. This determination permits generation of alerts for potential sleeping cells to help identify sleeping cells quickly, efficiently and with minimal impact on customers. As a result, the mobile network is able to perform at a higher performance level, compared to a network with undetected sleeping cells, for a greater percentage of time leading to higher customer satisfaction and increased revenues for the network operator.

FIG. 1 is a schematic diagram of a data collection system 100 in accordance with some embodiments. Data collection system 100 is able to collect information related to KPIs for cells within a mobile network. Data collection system 100 includes a radio unit and antenna (RIU) 110. The RIU 110 communicates with an enhanced nodeB (eNB) 120. The eNB 120 communicates with a server 130. The eNB 120 provides information related to functioning of the cell to the server 130. The server 130 collects the data from the eNB 120 and provides formatted data to an analyzer 140. The analyzer 140 determines the performance of the cell based on the formatted data. In some embodiments, the server 130 and the analyzer 140 are part of a same device. In some embodiments, at least a portion of the server 130 and a portion of the analyzer 140 are part of a same device. In some embodiments, the server 130 and the analyzer 140 are completely separate devices.

The RIU 110 provides an interface between the eNB 120 and terminal devices to permit the eNB 120 to communicate with the terminal devices. In some embodiments, the RIU 110 includes a plurality of radio interfaces for receiving communications in a variety of technologies and frequencies. In some embodiments, the RIU 110 includes at least one of an LTE RIU or a wideband code division multiple access (WCDMA) RIU.

The eNB 120 provides connection between a terminal device and the mobile network. The eNB 120 includes a virtual network function (VNF) 125, which in turn includes a virtualized distributed unit (VDU) 127 and a virtualized central unit (VCU) 129. The VDU 127 helps control the functioning of a group of cells within a geographic area. The VDU 127 helps to control hand offs from the terminal device to different cells within the geographic area. The VDU 127 is able to collect information related to whether connections to various cells within the geographic area are successfully establishing connections with terminal devices. The VCU 129 helps to control the functioning of a group of VDUs. In some embodiments, processing for operation of the mobile network is shared between the VDU 127 and the VCU 129. In some embodiments, the VDU 127 is in a same housing as the VCU 129. In some embodiments, the VDU 127 is in a separate housing from the VCU 129.

The server 130 receives information from the VNF 125 in order to determine KPIs for various cells connected to the eNB 120. The server 130 includes a virtual infrastructure manager (VIM) 132, which in turns includes a radio element management system (EMS) 134). The VIM 132 helps to control and manage resources of the mobile network. The radio EMS 134 helps the VIM 132 to identify events within the mobile network and manage equipment within the mobile network. The server 130 further includes an environment sensing capability (ESC) 136, which receives information from VNF 125 and VIM 132. The ESC 136 includes sensors for detecting the frequency used to communicate within the mobile network. The server 130 further includes a network service orchestrator (NSO) 138. The NSO 138 receives information from the VIM 132. The NSO 138 manages network services and controls the function of VNF 125. The NSO 138 also manages validation and authorization to access the mobile network. The NSO 138 is able to gather and organize the KPIs for cells that communicate with eNB 120. In some embodiments, all of the components of the server 130 are in a same device. In some embodiments, components of the server 130 are split across multiple devices. In some embodiments, information is transferred between components of the server 130 by a wired connection. In some embodiments, information is transferred between components of the server 130 by a wireless connection. In some embodiments, the server 130 communicates with the eNB 120 by a wired connection. In some embodiments, the server 130 communicates with the eNB 120 by a wireless connection.

The analyzer 140 receives information from the NSO 138 in order to analyze the KPIs to determine performance of the cells in communication with eNB 120. The analyzer 140 includes a data ingestion system 142 for receiving the information from the NSO 138. The data ingestion system 142 transfers the data to a data processing engine 143. Since the volume of information received from the NSO 138 is large and complex, the data processing engine 143 processes the data in order to organize and optimize the data for analysis. The processed data is then sent to a data storage unit 144. The data storage unit 144 is a non-transitory computer readable medium that stores the processed data for use in an application (App) layer 145. The App layer 145 retrieves data from the data storage unit 144 for analysis in order to determine how cells within the mobile network are functioning. The App layer 145 includes a performance management unit 146, a fault management unit 147 and a configuration management unit 148. The performance management unit 146 is used to process KPIs for cells connected to the eNB 120. The performance management unit 146 makes the KPI information usable for determination of whether a cell is a sleeping cell. The fault management unit 147 is used to determine whether any faults are identified for cells connected to the eNB 120. The configuration management unit 148 is used to determine the interconnection of the cells connected to the eNB 120. In some embodiments, all of the components of the analyzer 140 are in a same device. In some embodiments, components of the analyzer 140 are split across multiple devices. In some embodiments, information is transferred between components of the analyzer 140 by a wired connection. In some embodiments, information is transferred between components of the analyzer 140 by a wireless connection. In some embodiments, the server 130 communicates with the analyzer 140 by a wired connection. In some embodiments, the server 130 communicates with the analyzer 140 by a wireless connection.

Using data collection system 100 KPIs for cells within the mobile network are collected. These KPIs are then usable to determine whether one or more cells within the mobile network are sleeping. Data aggregation is used to group values of KPIs at different times in order to determine whether a cell is sleeping. In some embodiments, data aggregation is performed on all KPIs. In some embodiments, data aggregation is performed on targeted KPIs in order to reduce processing load during data aggregation. In some embodiments, data aggregation is performed on at least one of Zero RRC, CRC or SIB.

KPI information is collected on an hourly basis, for example, using data collection system 100. This information is then aggregated to permit determination of whether a cell is sleeping. The data aggregation collects information for one or more KPIs at different times on different days over a sample duration. The sample duration is the entire period over which KPI information is aggregated. In some embodiments, the sample duration is one week. In some embodiments, the sample duration is one month. In some embodiments, the sample duration is longer or shorter than one month. The data aggregation groups the KPI information for sample periods. A sample period is a number of consecutive hours that are grouped together during the data aggregation process. By grouping multiple hours together in the data aggregation process, abnormalities are more distributed than if information from only a single hour is used. As a result, false positives in determination of a sleeping cell are reduced. False positives result in inefficiency in operating the mobile network because time and resources are spend attempting to fix a properly functioning cell, which was erroneously determined to be a sleeping cell. In some embodiments, the sample period is four hours. In some embodiments, the sample period is greater than or less than four hours.

Figure 2:
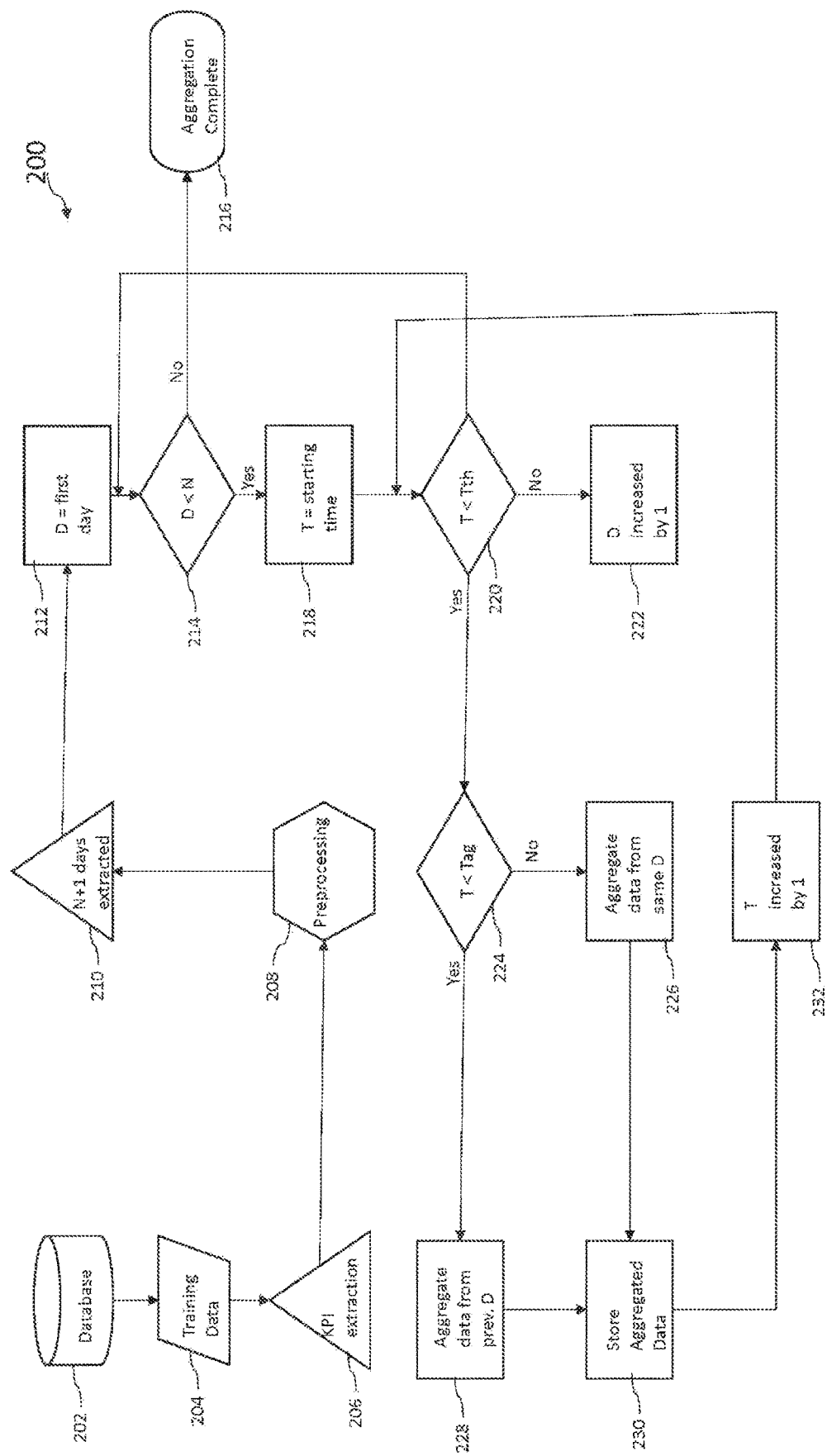
FIG. 2 is a flowchart of a method of data aggregation in accordance with some embodiments.

FIG. 2 is a flowchart of a method 200 of data aggregation in accordance with some embodiments. Method 200 is directed to aggregation of information related to one KPI. One of ordinary skill in the art would understand that method 200 is repeatable for aggregating information for any number of KPIs. In addition, aggregation sample periods and sample durations of method 200 are used merely as examples. One of ordinary skill in the art would understand that method 200 is capable of modification to cover a variety of sample duration and sample periods.

In operation 202, information is stored in a formatted database. The information includes stored training data as well as KPI information. In some embodiments, a portion of the information in the formatted databased is received from the data collection system 100. In some embodiments, a portion of the information in the formatted database is received from a user. In some embodiments, a portion of the information in the formatted database is provided by a supplier of the cell or another component of the mobile network.

In operation 204, training data is received. In some embodiments, the training data is received from the user. In some embodiments, the training data is retrieved from the formatted database. The training data is used to help ensure that method 200 is properly aggregating data.

In operation 206, KPI information is extracted. In some embodiments, the KPI information is extracted from the formatted database. In some embodiments, the KPI information is received from the data collection system 100. In some embodiments, the KPI information is received from an external device other than the data collection system 100. In some embodiments, the KPI information is related to Zero RRC. In some embodiments, the KPI information is related to CRC. In some embodiments, the KPI information is related to SIB.

In operation 208, the data related to the extracted KPI information is preprocessed. The preprocessing of the data formats the data into a form that is easier to analyze and aggregate.

In operation 210, the preprocessed data for N+1 days is extracted. In some embodiments, N ranges from about 14 days to about 35 days. In some embodiments, N is 30 days. In some embodiments, N is 14 days. In some embodiments, N is determined based on a user input. As the number of days increases, more data and therefore more accurate determinations are possible. However, as the number of days increase, the processing load for data aggregation also increases. If too few days, are selected as N then the risk of a false positive increases. Further, if the N is too high, then the sleeping cell would likely have already been identified based on customer complaints, so utilizing processing resources to identify a sleeping cell would be redundant and inefficient.

In operation 212, day D is set to a first day, i.e., D=1. The first day is the most recent day to which the aggregation is performed. For example, if the data aggregation is performed on February 1, then the first day would be January 31.

In operation 214, the day D is compared to the number N. In response to a determination that D is equal to or greater than N, i.e., "No," method 200 proceeds to operation 216 and the data aggregation process terminates. In response to a determination that D is less than N, i.e., "Yes," method 200 proceeds to operation 218.

In operation 216, aggregation of the KPI being analyzed is complete and method 200 terminates.

In operation 218, time T is set to a starting time. In some embodiments, the starting time is set to 00 hour, i.e., midnight. In some embodiments, the starting time is a time when the most recent data, e.g., from the data collection system 100, is received. In some embodiments, the starting time is set by the user. In some embodiments, the starting time is set to be a time when use of the mobile network is minimal. Minimal usage of the mobile network is determinable using historical usage data for the mobile network. In some embodiments, the starting time is set to a time when the most precise data is available. The time at this the most precise data is available is determinable using empirical analysis to determine when the fewest abnormalities, which can produce false positives, are detected.

In operation 220, the time T is compared to a threshold time. In some embodiments, the threshold time is 23 hours. In a situation where the starting time is 00 hours and the threshold time is 23 hours, aggregation is performed for all 24 hours of the day. In some embodiments, the threshold time is equal to a number of hours in an aggregated length of time for the KPI, for example, four hours. In some embodiments, the threshold time is set based on the KPI being aggregated. For example, in some embodiments, a threshold time for aggregating a KPI of Zero RRC is different for a threshold time for aggregating a KPI for SIB. In some embodiments, the threshold time is constant regardless of the KPI being aggregated. As the threshold time approaches 23 hours, an amount of data aggregated is increased, which provides more options for analysis of the aggregated data. Reducing the threshold time reduces the amount of processing load for implementing method 200. In response to a determination that the time T is equal to or greater than the threshold time, i.e., "No," the method 200 proceeds to operation 222. In response to a determination that the time T is less than the threshold time, i.e., "Yes," the method 200 proceeds to operation 224.

In operation 222, the day D is increased by one and method 200 returns to operation 214.

In operation 224, the time T is compared to the number of hours in an aggregated length of time. In some embodiments, the number of hours in an aggregated length of time is four hours. In some embodiments, the number of hours in an aggregated length of time is more or less than four hours. In some embodiments where the threshold time is equal to the number of hours in an aggregated length of time, operation 224 is omitted and method 200 proceeds from operation 220 to operation 228 in response to the time T being less than the threshold time. In some embodiments, the number of hours in an aggregated length of time is set based on the KPI being aggregated. For example, in some embodiments, a number of hours in an aggregated length of time for aggregating a KPI of Zero RRC is different for a number of hours in an aggregated length of time for aggregating a KPI for SIB. In some embodiments, the number of hours in an aggregated length of time is constant regardless of the KPI being aggregated. As a magnitude of the number of hours in an aggregated length of time increases, an impact of abnormalities in the preprocessed data is further reduced, which decreases the risk of a false positive. However, as the magnitude of the number of hours in an aggregated length of time increases, processing load for implementing method 200 also increases. In response to a determination that the time T is equal to or greater than the number of hours in an aggregated length of time, i.e., "No," the method 200 proceeds to operation 226. In response to a determination that the time is less than the number of hours in an aggregated length of time, i.e., "Yes," the method 200 proceeds to operation 228. In some embodiments which seek to minimize processing load while obtaining a sufficiently reliable aggregation to have an acceptable risk of false positives, the starting time is set to 06 hours (6:00 AM), the threshold time is set to four hours, and the number of hours in an aggregated length of time is set to 4 hours. In this example, data for the corresponding KPI collected to 6:00 AM, 7:00 AM, 8:00 AM and 9:00 AM will be aggregated by method 200.

In operation 226, the data corresponding to day D and time T is aggregated in a group with preceding data from the same day D. For example, in some embodiments where the number of hours in an aggregated length of time is four hours, operation 226 will aggregate the data for day D and time T with the data from a group including day D and time T−1, day D and time T−2, and day D and time T−3.

In operation 228, the data corresponding to day D and time T is aggregated in a group with preceding data from a previous day, i.e., day D−1. For example, in some embodiments where the number of hours in an aggregated length of time and the current time is T=2, operation 228 will aggregate the data for day D and time T with the data from a group including day D and time T−1, day D and time T−2, and day D−1 and time T=23.

In operation 230, the groupings from the aggregation in operation 226 or in operation 228 are stored in a memory. In some embodiments, the memory is an internal memory. In some embodiments, the memory is on a remote server. In some embodiments, the memory includes a cloud-based storage.

In operation 232, the time T is increased by one and method 200 returns to operation 224.

The method 200 aggregates data for a KPI for analysis to determine whether a cell is a sleeping cell. In some embodiments, the method 200 includes additional operations. For example, in some embodiments, the method 200 includes a display function to displaying aggregation results to the user. In some embodiments, at least one of the operations of method 200 is omitted. For example, in some embodiments, operation 204 is omitted if the method 200 is has already been trained. In some embodiments, an order of operations of the method 200 is changed. For example, in some embodiments, operation 206 is performed prior to operation 202 and the extracted KPI data is stored in the formatted database in following extraction.

Following aggregation of the KPI information, the aggregated data is analyzed to determine whether a cell is a sleeping cell. The following examples use a number of hours in an aggregated length of time of four hours. One of ordinary skill in the art would understand that the number of hours in an aggregated length of time of more or less than four hours is also possible. As the magnitude of the number of hours in an aggregated length of time increases the impact of abnormalities is reduced. However, a higher magnitude of the number of hours in an aggregated length of time increases processing load.

In order to determine whether a cell is a sleeping cell, the aggregated data from a most recent day is compared with the aggregated data from at least two previous days. In some embodiments, the analysis to determine whether a cell is a sleeping cell is only performed if the aggregated KPI values for the current day indicate that the cell is a sleeping cell. In some embodiments, the analysis is performed periodically regardless of whether the aggregated KPI values for the current day indicate that the cell is a sleeping cell. In some embodiments, accuracy is increased by using groups of aggregated data that span the same hours for each of the days being compared. For example, a group including data from 6:00 AM, 7:00 AM, 8:00 AM and 9:00 AM is used for each of the days compared. In some embodiments, a first of the previous days is the day immediately preceding the most recent day, i.e., yesterday. In some embodiments, the first of the previous days is earlier than the day immediately preceding the most recent day. As a duration between the most recent day and the first day of the previous days increases, a risk of the cell being in a sleeping state for a longer period of time before detection increases. As a result, a risk of customer dissatisfaction also increases. A second of the previous days is earlier than the first of the previous days. In some embodiments, the second of the previous days is a week from the most recent day. In some embodiments, the second of the previous days is sooner or later than a week from the most recent day. As a duration between the most recent day and the second day of the previous days increases, a risk of the cell being in a sleeping state for a longer period of time before detection increases. As a result, a risk of customer dissatisfaction also increases. As a duration between the most recent day and the second day of the previous days decreases, a risk of a false positive increases. In some embodiments, more than two previous days are analyzed to determine whether a cell is a sleeping cell. As a number of days analyzed increases, accuracy of the analysis increases. However, as the number of days analyzed increases, processing load for conducting the analysis also increases.

The aggregated KPI values for the most recent day and the at least two previous days are analyzed to determine whether a pattern exists that indicates the cell is a sleeping cell. In a situation where the aggregated KPI values from the most recent day indicate that the cell is a sleeping cell; and the aggregated KPI values for each of the at least two previous days indicate that the cell is not a sleeping cell, then the cell is determined to be a sleeping cell. Table 1 below provides an example of this pattern indicating a sleeping cell.

In some embodiments, prior to analyzing the aggregated data for KPIs, a status of the cell is check using standard fault detection, e.g., by fault management unit 147. That is, if the control system for a mobile network already indicates that a cell is faulty, for example, from a power outage or detectable hardware failure, then the cell will be scheduled for repair already and attempting to determine whether the cell is a sleeping cell is redundant.

TABLE 1

| Time Frame | Current Day | | Previous Day | | Previous Week | | Final Status |
|---|---|---|---|---|---|---|---|
| Current Hour (T0) | Aggregate | Sleeping | Aggregate | Not Sleeping | Aggregate | Not Sleeping | Sleeping |
| Previous Hour (T1) | (T0, T1, | | (T0, T1, | | (T0, T1, | | |
| 2 Hours Back (T2) | T2, T3) | | T2, T3) | | T2, T3) | | |
| 3 Hours Back (T3) | | | | | | | |

In a situation where the aggregated KPI values from the most recent day and the first day of the at least two previous days indicate that the cell is a sleeping cell; and the aggregated KPI values for the second day of the at least two previous days indicate that the cell is not a sleeping cell, then the cell is determined to be a sleeping cell. Table 2 below provides an example of this pattern indicating a sleeping cell.

In some embodiments, the aggregated data is performed for each identified KPI, e.g., Zero RRC, CRF and SIB. In some embodiments, if any single KPI indicates the cell is a sleeping cell, then analysis of the other KPIs is terminated in order to reduce processing load; and a cell is considered to be a sleeping cell.

Figure 3:
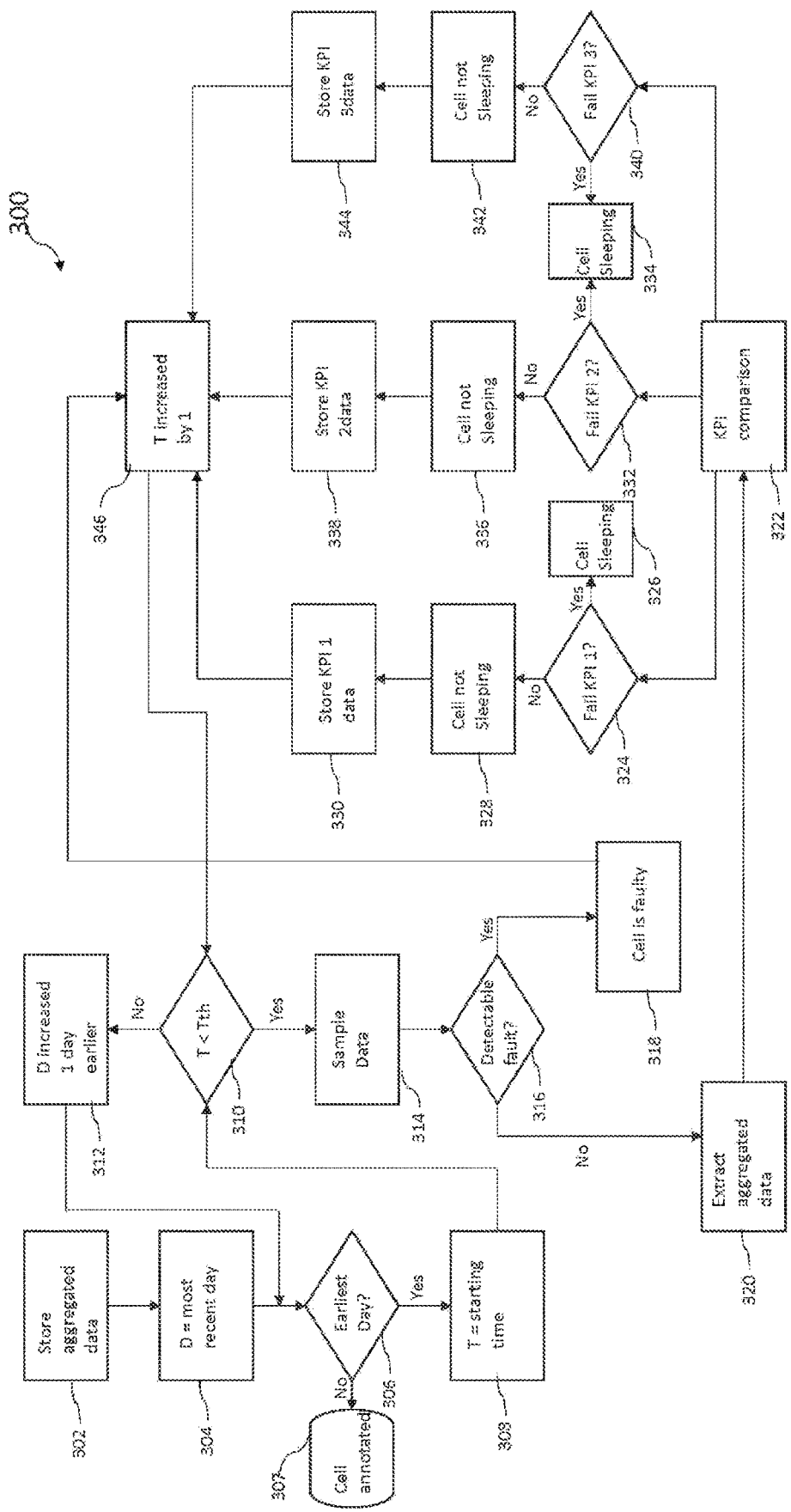
FIG. 3 is a flowchart of a method of data annotation in accordance with some embodiments.

FIG. 3 is a flowchart of a method 300 of data annotation in accordance with some embodiments. Data annotation

TABLE 2

| Time Frame | Current Day | | Previous Day | | Previous Week | | Final Status |
|---|---|---|---|---|---|---|---|
| Current Hour (T0) | Aggregate | Sleeping | Aggregate | Sleeping | Aggregate | Not Sleeping | Sleeping |
| Previous Hour (T1) | (T0, T1, | | (T0, T1, | | (T0, T1, | | |
| 2 Hours Back (T2) | T2, T3) | | T2, T3) | | T2, T3) | | |
| 3 Hours Back (T3) | | | | | | | |

In a situation where the aggregated KPI values from the most recent day and all of the at least two previous days indicate that the cell is a sleeping cell the cell is determined to not be a sleeping cell. Table 3 below provides an example of this pattern indicating a sleeping cell.

labels an analyzed cell as either sleeping or not sleeping. The method 300 is based on the analysis of three KPIs. In some embodiments, the method 300 is usable to analyze additional KPIs. The method 300 is based on comparing a most recent day in which data is available with two previous days.

TABLE 3

| Time Frame | Current Day | | Previous Day | | Previous Week | | Final Status |
|---|---|---|---|---|---|---|---|
| Current Hour (T0) | Aggregate | Sleeping | Aggregate | Sleeping | Aggregate | Sleeping | Not Sleeping |
| Previous Hour (T1) | (T0, T1, | | (T0, T1, | | (T0, T1, | | |
| 2 Hours Back (T2) | T2, T3) | | T2, T3) | | T2, T3) | | |
| 3 Hours Back (T3) | | | | | | | |

In a situation where the aggregated KPI values from the most recent day and the second day of the at least two previous days indicate that the cell is a sleeping cell; and the aggregated KPI values for the first day of the at least two previous days indicate that the cell is not a sleeping cell, then the cell is determined to not be a sleeping cell. Table 4 below provides an example of this pattern indicating a sleeping cell.

In some embodiments, the method 300 compares the most recent day in which data is available with more than two previous days.

In operation 302, aggregated data is stored in a storage unit. In some embodiments, the aggregated data is obtained from the method 200. In some embodiments, the aggregated data is obtained from an external database. In some embodi

TABLE 4

| Time Frame | Current Day | | Previous Day | | Previous Week | | Final Status |
|---|---|---|---|---|---|---|---|
| Current Hour (T0) | Aggregate | Sleeping | Aggregate | Not Sleeping | Aggregate | Sleeping | Non Sleeping |
| Previous Hour (T1) | (T0, T1, | | (T0, T1, | | (T0, T1, | | |
| 2 Hours Back (T2) | T2, T3) | | T2, T3) | | T2, T3) | | |
| 3 Hours Back (T3) | | | | | | | | ments, the aggregated data is obtained from a process other than the method 200.

In operation 304, day D is set to a most recent day in which data is available. In some embodiments, the day D is a day on which the analysis is performed. In some embodiments, the day D is a day prior to the day on which the analysis is performed.

In operation 306, the day D is compared with an earliest day which will be used for determining whether the cell is a sleeping cell. In some embodiments, the earliest day is one week from the most recent day. In some embodiments, the earliest day is less than a week from the most recent day. As a duration between the most recent day and the earliest day increases, a risk of the cell being in a sleeping state for a longer period of time before detection increases. As a result, a risk of customer dissatisfaction also increases. As a duration between the most recent day and the earliest day decreases, a risk of a false positive increases. In response to the day D being prior to the earliest day, i.e., "No," the method 300 proceeds to operation 307 and the method 300 terminates. In response to the day D being at or subsequent to the earliest day, i.e., "Yes," the method 300 proceeds to operation 308.

In operation 307, the method 300 ends and the cell is annotated to be a sleeping cell or not a sleeping cell based on labels set in operations 326 and 334, described below. If the label set in either the operation 326 or the operation 334 indicates that the cell is a sleeping cell, then the cell is annotated to be a sleeping cell. In some embodiments, if the label set in the operation 326 indicates a sleeping cell, the operation 307 does not check the label set in the operation 334. In some embodiments, if the label set in the operation 334 indicates a sleeping cell, the operation 307 does not check the label set in the operation 326. In some embodiments, the operation 307 always checks the labels set in both the operations 326 and 334 regardless of the label set in either of the operations 326 or 334.

In operation 308, a time T is set to be the starting time. In some embodiments, the starting time is set to 00 hour, i.e., midnight. In some embodiments, the starting time is a time when the most recent aggregated data, e.g., from the data aggregated in method 200. In some embodiments, the starting time is set by the user. In some embodiments, the starting time is set to a time when the most precise data is available. The time at this the most precise data is available is determinable using empirical analysis to determine when the fewest abnormalities, which can produce false positives, are detected.

In operation 310, the time T is compared to the threshold time. In some embodiments, the threshold time is 23 hours. In a situation where the starting time is 00 hours and the threshold time is 23 hours, annotation is performed for all 24 hours of the day. In some embodiments, the threshold time is equal to a number of hours in an aggregated length of time for the KPI, for example, four hours. In some embodiments, the threshold time is set based on the KPI. For example, in some embodiments, a threshold time for a KPI of Zero RRC is different for a threshold time for a KPI of SIB. In some embodiments, the threshold time is constant regardless of the KPI. As the threshold time approaches 23 hours, an amount of data annotated is increased, which provides more analysis of the aggregated data. Reducing the threshold time reduces the amount of processing load for implementing method 300. In response to a determination that the time T is equal to or greater than the threshold time, i.e., "No," the method 300 proceeds to operation 312. In response to a determination that the time T is less than the threshold time, i.e., "Yes," the method 300 proceeds to operation 314.

In operation 312, the day D is changed to one day earlier and the method 300 returns to operation 306.

In operation 314, sample data S is obtained from the aggregated data from a group in which time T is a latest time of the aggregated group. For example, at time T=3 and a number of hours in an aggregated group being four hours, the sample data S is obtained from an aggregation group including times T=3, T=2, T=1 and T=0.

In operation 316, a determination is made regarding whether the cell includes a fault detectable by a system, e.g., by fault management unit 147. In some embodiments, a fault is determined if the cell indicates a loss of power. In some embodiments, a fault is determined if an availability rate of the cell is less than 100%. In response to a determination that the cell includes a fault detectable by the system, i.e., "Yes," the method 300 proceeds to operation 318. Continued analysis of the KPIs is unnecessary because the cell will be serviced regardless of whether the cell is a sleeping cell. In response to a determination that the cell does not include a fault detectable by the system, i.e., "No," the method proceeds to operation 320.

In operation 318, the cell is determined to be faulty. In some embodiments, an alert is generated in operation 318 and the alert is automatically communicated to the user. In some embodiments, analysis of the cell stops after generating the alert unless the user instructions the analysis to continue.

In operation 320, aggregated data for at least two previous days prior to day D are extracted from the aggregated data, e.g., obtained using method 200. The aggregated data that is extracted has times in the extracted aggregated group which correspond to the current sample data S. In some embodiments, a first day of the at least two previous days is the day immediately prior to day D; and a second day of the at least two previous days is a week before day D. In some embodiments, other days are used for the at least two previous days. In some embodiments, aggregated data for more than two previous days is extracted. As a duration between the most recent day and the first day of the previous days increases, a risk of the cell being in a sleeping state for a longer period of time before detection increases. As a result, a risk of customer dissatisfaction also increases. A second of the previous days is earlier than the first of the previous days. In some embodiments, the second of the previous days is a week from the most recent day. In some embodiments, the second of the previous days is sooner or later than a week from the most recent day. As a duration between the most recent day and the second day of the previous days increases, a risk of the cell being in a sleeping state for a longer period of time before detection increases. As a result, a risk of customer dissatisfaction also increases. As a duration between the most recent day and the second day of the previous days decreases, a risk of a false positive increases. In some embodiments, more than two previous days are analyzed to determine whether a cell is a sleeping cell. As a number of days analyzed increases, accuracy of the analysis increases. However, as the number of days analyzed increases, processing load for conducting the analysis also increases. In some embodiments, the aggregated data is extracted from the storage unit. In some embodiments, the aggregated data is extracted from an external device.

In operation 322, the sample data S and the extracted aggregated data are compared against KPI threshold values for each of the KPIs. For example, in some embodiments, the sample data S, extracted aggregate data from the first day of the at least two previous days and extracted data from the second day of the at least two previous days for each KPI is compared to the corresponding KPI threshold value. In some embodiments, there are multiple KPI threshold values, which are indicative of different performance indicators associated with the KPI.

The KPI threshold values are set based on empirical data obtained by analyzing data collected for previously identified sleeping cells. In some embodiments, the KPIs checked in the operation 322 include Zero RRC, CRC and SIB. In some embodiments, at least one additional KPI is checked in the operation 322. In some embodiments, less than three KPIs are checked in the operation 322.

In some embodiments, the KPI is Zero RRC and the KPI threshold value is user attempts to connect to the cell. In some embodiments, the Zero RRC fails the threshold value in response to the number of user attempts to connect to the cell being more than 50 per hour. In some embodiments, the KPI is Zero RRC and KPI threshold value is incoming handover attempts from the cell. In some embodiments, the Zero RRC fails the threshold value in response to the number of incoming handover attempts from the cell being 0. In some embodiments, the KPI threshold is a combination of user attempts to connect to the cell and the incoming handover attempts. In response to a determination that the KPI value fails the KPI threshold value, the cell is determined to be a sleeping cell.

In some embodiments, the KPI is CRC and the KPI threshold value is random channel setup success rate (RACH SSR). In some embodiments, the CRC fails the threshold value in response to the RACH SSR being less than 80%. In some embodiments, the KPI is CRC and KPI threshold value is random channel (RACH) attempts by users. In some embodiments, the CRC fails the threshold value in response to the number of RACH attempts being more than 100 per hour. In some embodiments, the KPI is CRC and KPI threshold value is incoming handover attempts to connect to the cell. In some embodiments, the CRC fails the threshold value in response to the number of incoming handover attempts being greater than zero. In some embodiments, the KPI threshold is a combination of RACH SSR, RACH attempts and/or incoming handover attempts. In response to a determination that the KPI value fails the KPI threshold value, the cell is determined to be a sleeping cell.

In some embodiments, the KPI is SIB-1 and the KPI threshold value is a number of broadcasts per hour. In some embodiments, the SIB-1 fails the threshold value in response to the number of broadcasts per hour is less than 180,000. In response to a determination that the KPI value fails the KPI threshold value, the cell is determined to be a sleeping cell.

In operation 324, a determination is made regarding whether a first KPI satisfies conditions for labeling the cell a sleeping cell. The determination is made based on the comparison between the sample data S and the extracted aggregated and the corresponding KPI threshold values in the operation 322. The determination is based on detection of a pattern which indicates whether the cell is a sleeping cell or not a sleeping cell, e.g., the patterns in Tables 1-4 above. In some embodiments, the first KPI is Zero RRC. In some embodiments, the first KPI is a different KPI. In response to a determination that the first KPI satisfies conditions for labeling the cell a sleeping cell, i.e., "Yes," the method 300 proceeds to operation 326. In response to a determination that the first KPI fails to satisfy the conditions for labeling the cell a sleeping cell, i.e., "No," the method 300 proceeds to operation 328.

In operation 326, the cell is labeled as a sleeping cell. In some embodiments, an alert is generated in response to labeling the cell as a sleeping cell.

In operation 328, the cell is labeled as not being a sleeping cell.

In operation 330, the data associated with the sample data S and the extracted aggregated data for the first KPI are stored. In some embodiments, the data is stored in the storage unit. In some embodiments, the data is stored in a separate memory. In some embodiments, the data is stored in a cloud-based memory.

In operation 332, a determination is made regarding whether a second KPI satisfies conditions for labeling the cell a sleeping cell. The determination is made based on the comparison between the sample data S and the extracted aggregated and the corresponding KPI threshold values in the operation 322. The determination is based on detection of a pattern which indicates whether the cell is a sleeping cell or not a sleeping cell, e.g., the patterns in Tables 1-4 above. In some embodiments, the second KPI is CRC. In some embodiments, the second KPI is a different KPI. In response to a determination that the second KPI satisfies conditions for labeling the cell a sleeping cell, i.e., "Yes," the method 300 proceeds to operation 334. In response to a determination that the second KPI fails to satisfy the conditions for labeling the cell a sleeping cell, i.e., "No," the method 300 proceeds to operation 336.

In operation 334, the cell is labeled as a sleeping cell. In some embodiments, an alert is generated in response to labeling the cell as a sleeping cell.

In operation 336, the cell is labeled as not being a sleeping cell.

In operation 338, the data associated with the sample data S and the extracted aggregated data for the second KPI are stored. In some embodiments, the data is stored in the storage unit. In some embodiments, the data is stored in a separate memory. In some embodiments, the data is stored in a cloud-based memory.

In operation 340, a determination is made regarding whether a third KPI satisfies conditions for labeling the cell a sleeping cell. The determination is made based on the comparison between the sample data S and the extracted aggregated and the corresponding KPI threshold values in the operation 322. The determination is based on detection of a pattern which indicates whether the cell is a sleeping cell or not a sleeping cell, e.g., the patterns in Tables 1-4 above. In some embodiments, the third KPI is SIB. In some embodiments, the third KPI is a different KPI. In response to a determination that the third KPI satisfies conditions for labeling the cell a sleeping cell, i.e., "Yes," the method 300 proceeds to operation 334. In response to a determination that the third KPI fails to satisfy the conditions for labeling the cell a sleeping cell, i.e., "No," the method 300 proceeds to operation 342.

In operation 342, the cell is labeled as not being a sleeping cell.

In operation 344, the data associated with the sample data S and the extracted aggregated data for the third KPI are stored. In some embodiments, the data is stored in the storage unit. In some embodiments, the data is stored in a separate memory. In some embodiments, the data is stored in a cloud-based memory.

In some embodiments, the operations 324, 332 and 340 are performed simultaneously. In some embodiments, the operations 324, 332 and 340 are performed sequentially in any order. In some embodiments, the operations 322 and 340 are skipped in response to performing operation 326. In some embodiments, the operation 324 and one of the operations 332 or 340 are skipped in response to performing the operation 334.

In operation 346, the time T is increased by one and the method 300 returns to operation 310.

The method 300 annotates data for cells based on analysis of aggregated KPI values to determine whether a cell is a sleeping cell. In some embodiments, the method 300 includes additional operations. For example, in some embodiments, the method 300 includes generating an alert, such as an audio or visual alert, in response to labeling a cell as a sleeping cell. In some embodiments, at least one of the operations of method 300 is omitted. For example, in some embodiments, operations 332-342 are omitted if the method 300 is performed for a single KPI. In some embodiments, an order of operations of the method 300 is changed. For example, in some embodiments, operations 330, 338 and 344 are performed simultaneously or sequentially.

Using method 300 a network operator is able to determine whether a cell is a sleeping cell without waiting for customer complaints or relying on manual checking or maintenance of the cell. This improves reliability of the mobile network in comparison with other approaches.

Once a cell is labeled as a sleeping cell, the sleeping cell corrective actions are taken to change the state of the cell to not sleeping. In some embodiments, the cell is rebooted remotely. In some embodiments, one or more components of the cell are remotely reactivated. In some embodiments, a maintenance crew is dispatched to the cell to perform maintenance on the cell. In some embodiments, if a cell is repeatedly determined to be in a sleeping state, the cell is deemed faulty and is replaced with a new cell.

Based on method 300, a sleeping cell is able to be identified. However, the amount of data involved in determining whether each cell in a mobile network is sleeping is significant. For example, in a network of approximately 8,000 cells, only 20-30 cells are likely to be sleeping cells. Therefore, in larger mobile networks, manually performing checking of each cell is not an efficient use of resources. A machine learning system is usable to determine whether a cell is a sleeping cell.

Figure 4:
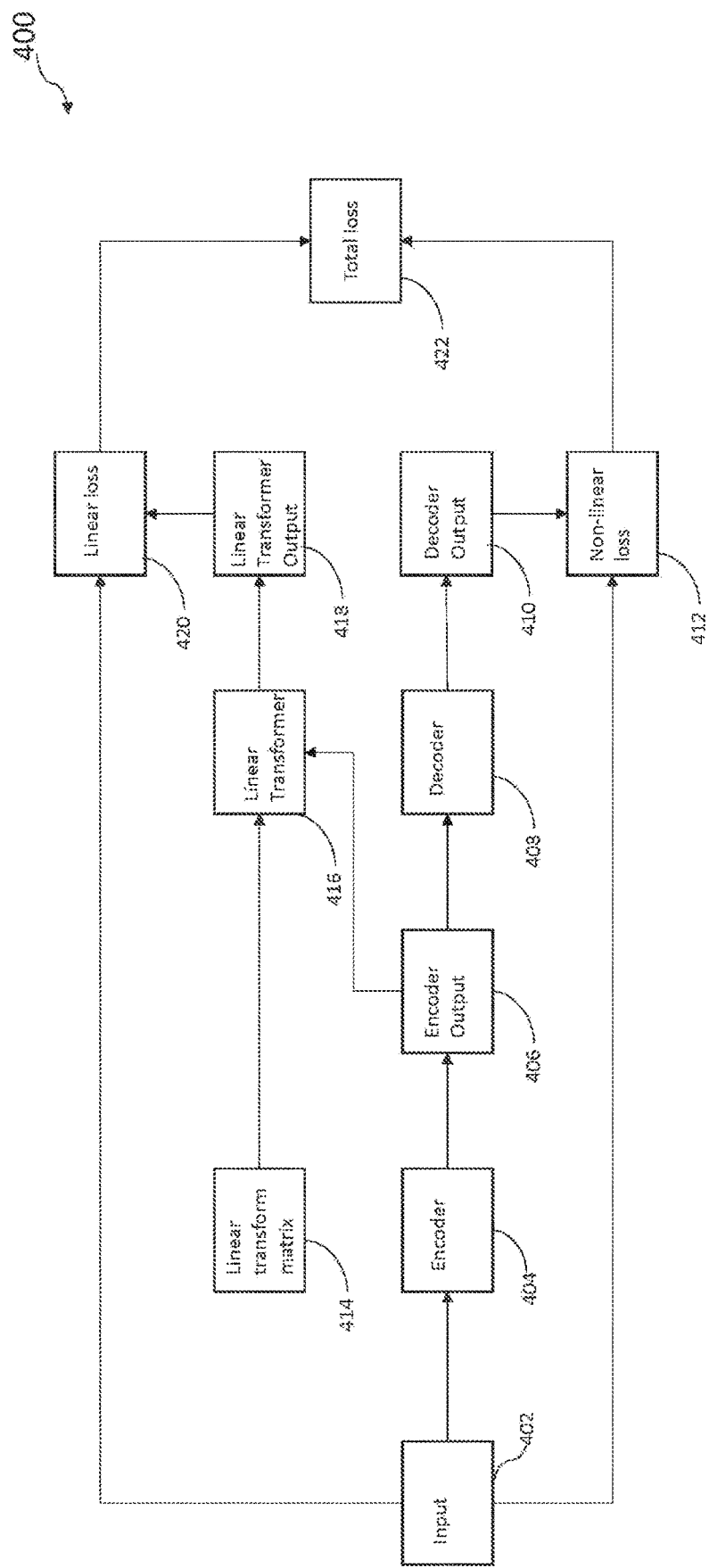
FIG. 4 is a functional diagram of a machine learning system in accordance with some embodiments.

FIG. 4 is a functional diagram of a machine learning system 400 in accordance with some embodiments. The machine learning system 400 is able to receive input data and perform both linear and non-linear analysis on the input data to generate an algorithm for determining whether a cell is a sleeping cell. Using the machine learning system 400 helps to improve the speed of the determination of whether a cell is a sleeping cell in order to permit efficient monitoring and maintenance of a large mobile network.

The machine learning system 400 includes one more processor whose functionality is described based on the functional diagram of FIG. 4. An input 402 is received. In some embodiments, the input 402 is received based on the results of the method 200. In some embodiments, the input 402 is received from the server 130 and data aggregation is performed by the machine learning system 400. In some embodiments, the input 402 is received from another external device.

An encoder 404 receives the input 402 and encodes the input based on encoding parameters. The encoding parameters for the encoder 404 are learned by using testing data and reconstruction of loss between input data that is encoded and then decoded. In some embodiments, the encoding parameters of the encoder include a weight W and a bias b. The weight W and bias b are used to account for latent factors within the encoder 406 that lead to reconstruction errors once the encoded data is later decoded. In some embodiments, the encoder 404 further uses an activation function, such as a rectified linear unit (ReLU) activation function, for encoding the input 402. During a training phase of the machine learning system 400, the encoding parameters are updated. During a testing phase of the machine learning system 400, the encoding parameters are usable to identify sleeping cells.

The encoder output 406 includes embedded data that is based on the input 402 as well as the encoding parameters from the encoder 404. In some embodiments, the encoder output 406 is based on Equation (1) below:

$$z = \alpha(x) \triangleq \sigma(Wx + b) \quad \text{(Equation 1)}$$

where x is the input data, W is the weight, b is the bias, $\sigma$ is the activation function, and z is the embedded data.

The encoder output 406 is sent to a decoder 408. The decoder 408 decodes the encoder output 406 in order to reconstruct the input data based on decoding parameters. The decoding parameters for the decoder 408 are learned by using testing data and reconstruction of loss between input data that is encoded and then decoded. In some embodiments, the decoding parameters of the encoder include a weight W and a bias b. The weight W and bias b are used to account for latent factors within the decoder 408 that lead to reconstruction errors once the encoded data is later decoded. In some embodiments, the decoder 408 further uses an activation function, such as a rectified linear unit (ReLU) activation function, for decoding the encoder output 406. During a training phase of the machine learning system 400, the decoding parameters are updated. During a testing phase of the machine learning system 400, the decoding parameters are usable to identify sleeping cells.

The decoder output 410 includes reconstructed data that is based on the encoder output as well as the decoder parameters from the decoder 408. In some embodiments, the decoder output 410 is based on Equation (2) below:

$$\tilde{x} = \beta(z) \triangleq \tilde{\sigma}(\tilde{W}z + \tilde{b}) \quad \text{(Equation 2)}$$

where z is the embedded data, $\tilde{W}$ is the weight, $\tilde{b}$ is the bias, $\tilde{\sigma}$ is the activation function, and $\tilde{x}$ is the reconstructed data.

The non-linear loss 412 is calculated based on the reconstructed data from the decoder output 410. In some embodiments, the non-linear loss 412 is calculated using a mean square error analysis. In some embodiments, the non-linear loss 412 is calculated based on Equation (3) below:

$$\text{LOSS}_{Nonlinear} = \|x_i - \bar{g}(e_i; \overline{W}, \overline{b})\|^2 \quad \text{(Equation 3)}$$

Where xi is the input data, $\bar{g}$ is a decoding function, $e_i$ is the embedded data corresponding to the input data xi, $\overline{W}$ is the weight for the decoder 408 and $\overline{b}$ is the bias for the decoder 408.

A linear transformation matrix 414 is generated. An initial linear transformation matrix 414 is calculated by performing principal component analysis (PCA) on a training set of data. During a training phase of the machine learning system 400, the linear transformation matrix 414 is updated. During a testing phase of the machine learning system 400, the linear transformation matrix 414 is usable to identify sleeping cells.

The linear transformation matrix 414 received by a linear transformer 416. The linear transformer 416 utilizes a transposed linear transformation matrix based on the linear transformation matrix 414, in combination with the embedded data and the input to reconstruct the input. The embedded data is received from the encoder output 406.

The linear transformer output 418 includes the reconstructed data.

The linear loss 420 is calculated based on the reconstructed data from the linear transformer output 418. In some embodiments, the linear loss 420 is calculated using a mean square error analysis. In some embodiments, the linear loss 420 is calculated based on Equation (4) below:

$$\text{LOSS}_{Linear} = \|x_i - g(x_i; W, b) B^T\|^2 \quad \text{(Equation 4)}$$

Where $x_i$ is the input data, g is an encoding function, $B^T$ is a transpose of the linear transformation matrix 414, W is the weight for the encoder 404 and b is the bias for the encoder 404.

The non-linear loss 412 is combined with the linear loss 420 to determine the total loss 422. In some embodiments, the non-linear loss 412 is added to the linear loss 420 to determine the total loss 422. In some embodiments, the non-linear loss 412 is multiplied by the linear loss 420 to determine the total loss 422. In some embodiments, the non-linear loss 412 is combined with the linear loss 420 in a manner other than multiplication or addition. During the testing phase, the encoder parameters, the decoder parameters and the linear transformation matrix 414 are updated in order to minimize the total loss 422.

Using the machine learning system 400, an algorithm for determining whether a cell is a sleeping cell is determined. Testing data is provided to the machine learning system 400 until the total loss 422 is minimized or until a maximum number of epochs is reached. In some embodiments, the maximum number of epochs is set by the user. In some embodiments, the maximum number of epochs is based on a number of cells in the mobile network.

Once the machine learning system 400 completes a testing phase using testing data, the encoding parameters, the decoding parameters and the linear transformation matrix 414 are stored for use in the testing phase. During the testing phase, the machine learning system 400 is used to generate the reconstructed data for both the non-linear analysis and the linear analysis in order to determine whether a cell is a sleeping cell.

Figure 5:
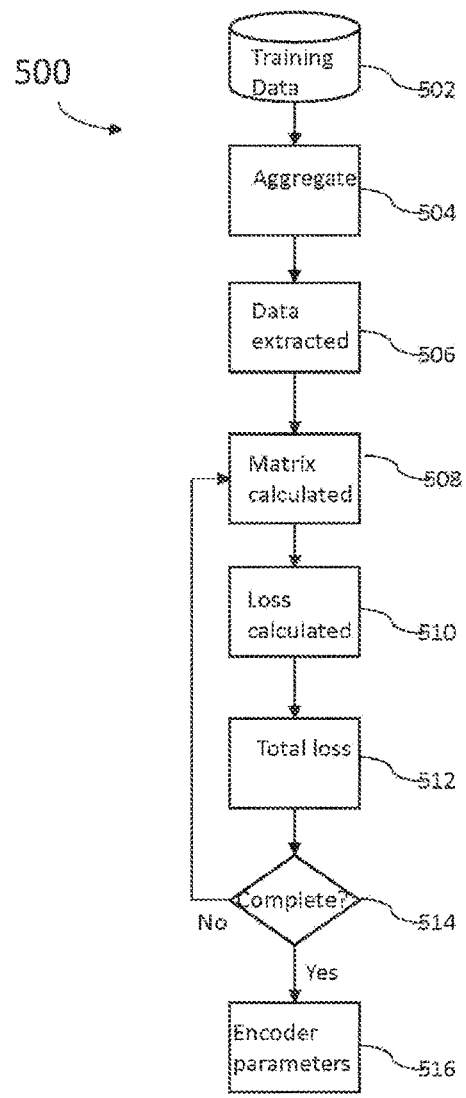
FIG. 5 is a flowchart of a method of training a machine learning system in accordance with some embodiments.

FIG. 5 is a flowchart of a method 500 of training a machine learning system in accordance with some embodiments. The method 500 is used to train a machine learning system, e.g., machine learning system 400, for determining whether a cell is a sleeping cell. The method 500 is repeated for each KPI to be analyzed by the machine learning system in order to train the encoder parameters, decoder parameters and linear transformation matrix for each KPI.

In operation 502, training data is received by the machine learning system. In some embodiments, the training data is provided by the user. In some embodiments, the training data is generated based on empirical analysis of cells in the mobile network. In some embodiments, the training data is generated based on a design of an encoder, e.g., the encoder 404.

In operation 504 the training data is aggregated for a KPI. In some embodiments, the KPI is selected based on a correlation between the KPI and a sleeping cell. In some embodiments, the KPI is Zero RRC, CRC or SIB. In some embodiments, the training data is aggregated based on method 200. In some embodiments, an aggregation process other than method 200 is used on the training data.

In operation 506, non-sleeping cell data samples are extracted, and the aggregated training data is standardized. Extracting non-sleeping cell data permits the machine learning system to determine how the data reflects normal performance of the cell.

In operation 508, a linear transformation matrix is calculated. In an initial execution of the operation 508, the linear transformation matrix is determined by performing PCA on the aggregated training data. In subsequent executions of the operation 508, the linear transformation matrix is calculated by adjusting the linear transformation matrix from a preceding iteration in an attempt to minimize a total loss, e.g., total loss 422, calculated by the machine learning system.

In operation 510, a linear loss, e.g., linear loss 420, and a non-linear loss, e.g., non-linear loss 412, are calculated by the machine learning system based on the calculated linear transformation matrix as well as the encoder and decoder parameters. In some embodiments, the linear loss and the non-linear loss are calculated based on the above description with respect to machine learning system 400.

In operation 512 a total loss, e.g., total loss 422, is calculated based on the linear loss and the non-linear loss. In some embodiments, the non-linear loss is added to the linear loss to determine the total loss. In some embodiments, the non-linear loss is multiplied by the linear loss to determine the total loss. In some embodiments, the non-linear loss is combined with the linear loss in a manner other than multiplication or addition.

In operation 514 a determination is made regarding whether the training process is completed. In some embodiments, the determination is made that the training process is completed in response to minimizing the total loss. In some embodiments, the determination is made that the training process is completed in response to a number of epochs of the training phase reaching a maximum number of epochs. In some embodiments, the maximum number of epochs is set by the user. In some embodiments, the maximum number of epochs is based on a number of cells in the mobile network. In response to a determination that the training process is not completed, i.e., "No," the method 500 returns to operation 508. In response to a determination that the training process is completed, i.e., "Yes," the method 500 proceeds to operation 516.

In operation 516 the encoder parameters, the decoder parameters and the linear transformation matrix are stored for use in a testing phase. In some embodiments, the encoder parameters, the decoder parameters and the linear transformation matrix are stored in a local memory. In some embodiments, the encoder parameters, the decoder parameters and the linear transformation matrix are stored in an external memory. In some embodiments, the encoder parameters, the decoder parameters and the linear transformation matrix are stored in a cloud based memory.

The method 500 trains a machine learning system for determining whether a cell is a sleeping cell. In some embodiments, the method 500 includes additional operations. For example, in some embodiments, the method 500 includes updating of the encoder parameters or the decoder parameters during the training of the machine learning system. In some embodiments, at least one of the operations of method 500 is omitted. For example, in some embodiments, the operation 504 is omitted if the training data is already aggregated in a manner usable by the machine learning system. In some embodiments, an order of operations of the method 500 is changed. For example, in some embodiments, the operation 516 is performed prior to the operation 514, i.e., during each iteration. In some embodiments, the method 500 is used to train a separate machine learning system for each KPI that will be analyzed. In some embodiments, the method 500 is used to train a single machine learning system for analyzing all KPIs; and the corresponding linear transformation matrix, encoder parameters and decoder parameters are extracted by the machine learning system based on the KPI currently being analyzed. In some embodiments, method 500 is repeated on a regular basis to update the training of the machine learning system to account for drift in the functionality of the cells or the machine learning system. In some embodiments, the method 500 is repeated in response to adding a new cell to the mobile network.

Using method 500 a machine learning system is trained to determine whether a cell is a sleeping cell. Once the machine learning system is trained, the machine learning system will be able to rapidly automatically analyze the cells of the mobile network to identify sleeping cells more rapidly than other approaches.

Figure 6:
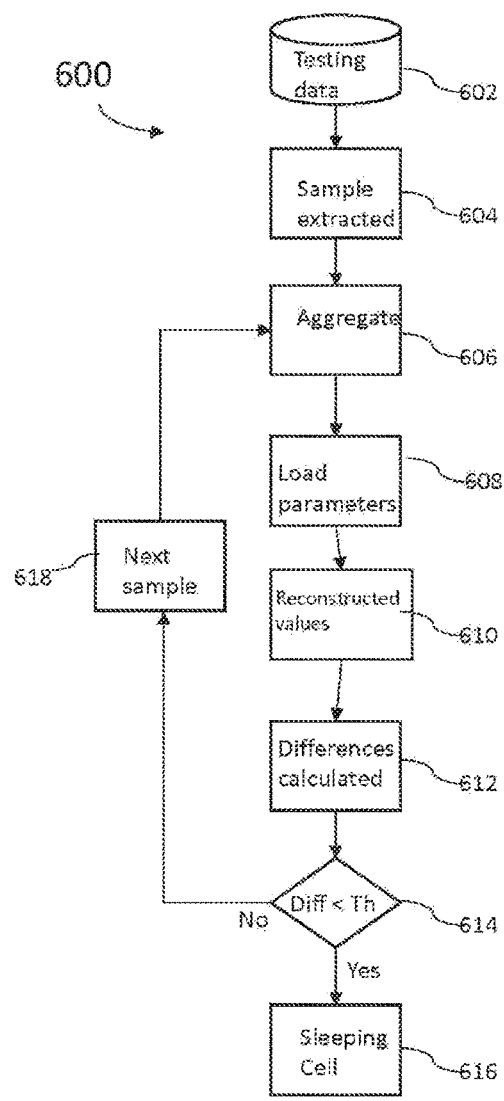
FIG. 6 is a flowchart of a method of testing a mobile network using a machine learning system in accordance with some embodiments.

FIG. 6 is a flowchart of a method 600 of testing a mobile network using a machine learning system in accordance with some embodiments. The method 600 uses a trained machine learning system, e.g., machine learning system 400, for determining whether a cell is a sleeping cell. The method 600 is repeated for each KPI to be analyzed by the machine learning system in order to determine whether a cell is a sleeping cell.

In operation 602 testing data is received. In some embodiments, the testing data is received from a server, e.g., the server 130. In some embodiments, the testing data is aggregated prior to being received. The aggregated testing data is aggregated for a KPI being analyzed. In some embodiments, the testing data was aggregated using method 200.

In operation 604 a testing sample is extracted from the received testing data. The extracted testing sample is for a KPI currently being analyzed by the machine learning system.

In operation 606 the extracted testing sample is aggregated. In some embodiments, the extracted testing sample is aggregated based on method 200. In some embodiments, an aggregation process other than method 200 is used on the extracted testing sample.

In operation 608 saved model parameters are loaded into the machine learning system. The save model parameters include the encoder parameter, the decoder parameters and the linear transformation matrix associated with a KPI currently be analyzed. In some embodiments, where the machine learning system is used to analyze only a single KPI, the operation 608 is omitted. In such embodiments, other machine learning systems will analyze other KPIs to identify sleeping cells.

In operation 610, a linear reconstructed value, e.g., linear reconstructed data 418, and a non-linear reconstructed value, e.g., non-linear reconstructed data 410, are calculated by the machine learning system based on the extracted testing sample and the loaded model parameters. In some embodiments, the linear reconstructed value and the non-linear reconstructed value are calculated based on the above description with respect to machine learning system 400.

In operation 612 a first difference d1 is calculated based on a difference between the linear reconstructed value and the extracted testing sample. A second difference d2 is calculated based on a difference between the non-linear reconstructed value and the extracted testing sample. In some embodiments, the first difference d1 and the second difference d2 are calculated using a means square error calculation.

In operation 614 an average of the first difference d1 and the second difference d2 is compared to a difference threshold value. The difference threshold value is determined based on empirical analysis of the KPIs for sleeping cells. In some embodiments, the difference threshold values are set by the user. In response to a determination that the average of the first difference d1 and the second difference d2 is less than the threshold value, i.e., "Yes," the method proceeds to operation 616. In response to a determination that the average of the first difference d1 and the second difference d2 is equal to or greater than the threshold value, i.e., "No," the method 600 proceeds to operation 618.

In operation 616 the cell is labeled as a sleeping cell. Identifying information for the sleeping cell is stored. In some embodiments, the KPI which indicated that the cell is a sleeping cell is stored with the identifying information for the sleeping cell. In some embodiments, an alert is generated in response to labelling a cell a sleeping cell. In some embodiments, the alert is an audio or visual alert. In some embodiments, a maintenance request is automatically generated in response to labeling a cell a sleeping cell. In some embodiments, the maintenance request includes a recommendation for remedial action for adjusting the cell to return to normal performance.

In operation 618 a next testing sample is extracted from the testing data and the method then returns to operation 606.

The method 600 uses a machine learning system for determining whether a cell is a sleeping cell. In some embodiments, the method 600 includes additional operations. For example, in some embodiments, the method 600 includes generating an alert or recommending maintenance in response to labeling a cell a sleeping cell. In some embodiments, at least one of the operations of method 600 is omitted. For example, in some embodiments, the operation 606 is omitted if the received testing data is already aggregated in a manner usable by the machine learning system. In some embodiments, an order of operations of the method 600 is changed. For example, in some embodiments, the operation 608 is performed prior to the operation 606. In some embodiments, the method 600 is used to determine whether a cell is a sleeping cell for each KPI. In some embodiments, the method 600 is repeated for all KPIs being analyzed. In some embodiments, prior to executing method 600 the machine learning system checks to determine whether a cell to be analyzed is already labeled a sleeping cell. In response to a determination that the cell is already labeled as a sleeping cell, that cell is not analyzed. In some embodiments, method 600 is performed simultaneously for multiple KPIs on multiple machine learning systems.

Using method 600 a machine learning system determines whether a cell is a sleeping cell. By using the machine learning system, a sleeping cell is identified more efficiently than in other approaches. As a result, the network operator is able to increase customer satisfaction with the mobile network and generate more revenue.

Figure 7:
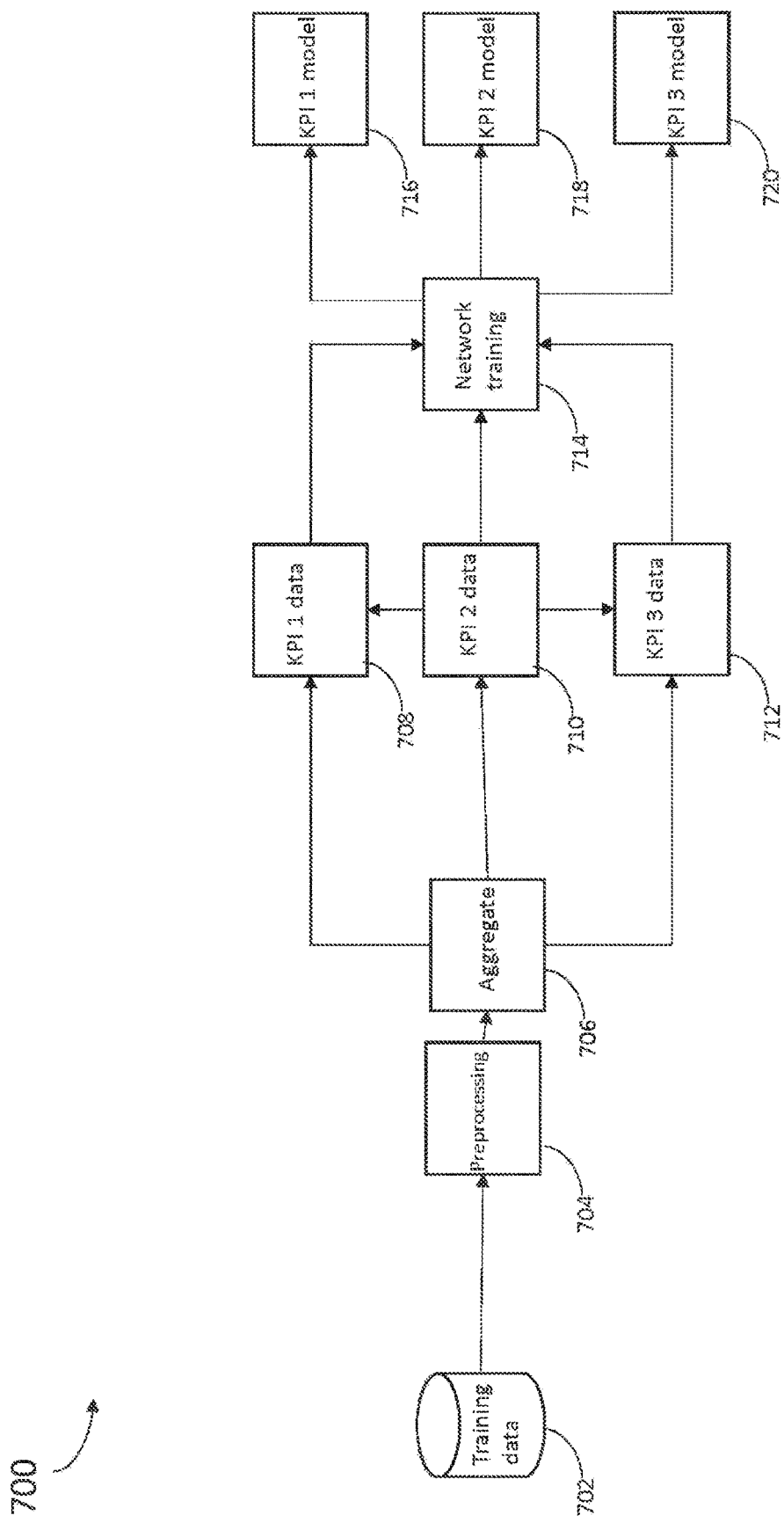
FIG. 7 is a flowchart of a method of training classifiers based on KPIs in accordance with some embodiments.

FIG. 7 is a flowchart of a method 700 of training classifiers based on KPIs in accordance with some embodiments. The method 700 is usable in combination with method 500 or machine learning system 400. The method 700 is directed to training classifiers for three KPIs. One of ordinary skill in the art would recognize that the method 700 is able to be modified to train classifier for more or less than three KPIs.

In operation 702, training data is received. In some embodiments, the training data is provided by the user. In some embodiments, the training data is generated based on empirical analysis of cells in the mobile network. In some embodiments, the training data is generated based on a design of an encoder, e.g., the encoder 404, used during network training (operation 714).

In operation 704 the training data is preprocessed. The preprocessing of the training data formats the training data into a form that is easier to analyze and aggregate.

In operation 706 the preprocessed data is aggregated. The preprocessed data is aggregated based on a KPI associated with the data. In some embodiments, the preprocessed data is aggregated using method 200. In some embodiments, the preprocessed data is aggregated using a method other than method 200.

In operation 708 the aggregated data associated with a first KPI is extracted from the aggregated data. In some embodiments, the first KPI is Zero RRC. In some embodiments, the first KPI is different from Zero RRC.

In operation 710 the aggregated data associated with a second KPI is extracted from the aggregated data. In some embodiments, the second KPI is CRC. In some embodiments, the second KPI is different from CRC.

In operation 712 the aggregated data associated with a third KPI is extracted from the aggregated data. In some embodiments, the third KPI is SIB. In some embodiments, the third KPI is different from SIB.

In operation 714 network training is performed using the aggregated data associated with each of the KPIs. In some embodiments, the network training is performed using machine learning system 400. In some embodiments, the network training is performed using the aggregated data associated with each KPI simultaneously. In some embodiments, the network training is performed using the aggregated data associated with each KPI sequentially. In some embodiments, the network training is performed for aggregated data associated with each KPI on separate machine learning systems. In some embodiments, the network training is performed for aggregated data associated with each KPI on a same machine learning system.

In operation 716 a model for the first KPI is output. The model for the first KPI includes encoder parameters, decoder parameters and a linear transformation matrix for the first KPI. The model for the first KPI is usable in the operation 608 of the method 600 when the first KPI is being tested.

In operation 718 a model for the second KPI is output. The model for the second KPI includes encoder parameters, decoder parameters and a linear transformation matrix for the second KPI. The model for the second KPI is usable in the operation 608 of the method 600 when the second KPI is being tested.

In operation 720 a model for the third KPI is output. The model for the third KPI includes encoder parameters, decoder parameters and a linear transformation matrix for the third KPI. The model for the third KPI is usable in the operation 608 of the method 600 when the third KPI is being tested.

The method 700 generates models for each KPI to be analyzed by a machine learning system for determining whether a cell is a sleeping cell. In some embodiments, the method 700 includes additional operations. For example, in some embodiments, the method 700 includes an operation for selecting the KPI used to generate a model. In some embodiments, at least one of the operations of method 700 is omitted. For example, in some embodiments, the operation 704 is omitted if the training data is already preprocessed prior to being received. In some embodiments, an order of operations of the method 700 is changed. For example, in some embodiments, the operation 714 is performed simultaneously for each KPI or performed sequentially for each KPI. In some embodiments, method 700 is repeated on a regular basis to update the model to account for drift in the functionality of the cells or the machine learning system. In some embodiments, the method 700 is repeated in response to adding a new cell to the mobile network.

Using method 700 a model is generated for a machine learning system to determine whether a cell is a sleeping cell. Once the model is generated, the machine learning system will be able to rapidly automatically analyze the cells of the mobile network to identify sleeping cells more rapidly than other approaches.

Figure 8:
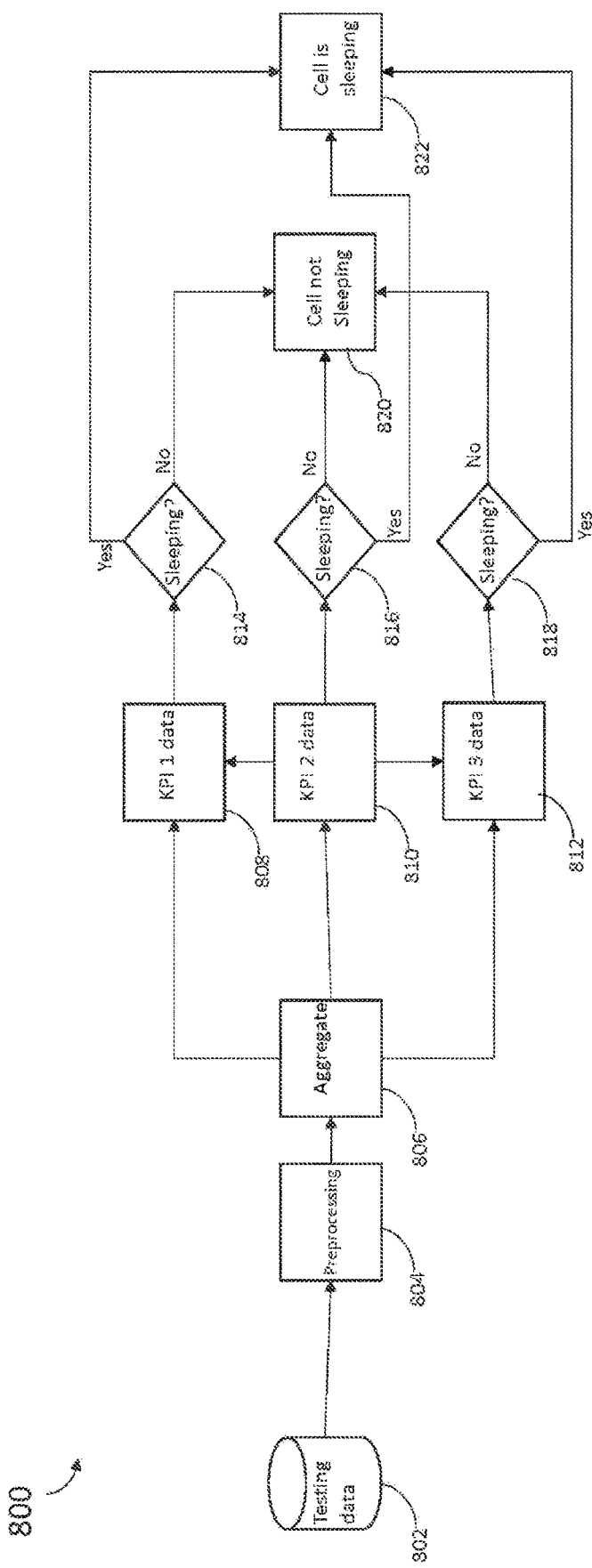
FIG. 8 is a flowchart of a method of inferencing based on testing data in accordance with some embodiments.

FIG. 8 is a flowchart of a method 800 of inferencing based on testing data in accordance with some embodiments. The method 800 is usable in combination with method 600 or machine learning system 400. The method 800 is directed to inferencing using three KPIs. One of ordinary skill in the art would recognize that the method 800 is able to be modified to perform inferencing for more or less than three KPIs.

In operation 802, testing data is received. In some embodiments, the testing data is received from a server, e.g., the server 130. In some embodiments, the testing data is received from an external device. In some embodiments, the testing data is retrieved from a memory.

In operation 804 the testing data is preprocessed. The preprocessing of the testing data formats the testing data into a form that is easier to analyze and aggregate.

In operation 806 the preprocessed data is aggregated. The preprocessed data is aggregated based on a KPI associated with the data. In some embodiments, the preprocessed data is aggregated using method 200. In some embodiments, the preprocessed data is aggregated using a method other than method 200.

In operation 808 the aggregated data associated with a first KPI is extracted from the aggregated data and analyzed using a model for the first KPI. In some embodiments, the model for the first KPI is developed using method 700. In some embodiments, the analysis is performed using machine learning system 400. In some embodiments, the first KPI is Zero RRC. In some embodiments, the first KPI is different from Zero RRC.

In operation 810 the aggregated data associated with a second KPI is extracted from the aggregated data and analyzed using a model for the second KPI. In some embodiments, the model for the second KPI is developed using method 700. In some embodiments, the analysis is performed using machine learning system 400. In some embodiments, the second KPI is CRC. In some embodiments, the second KPI is different from CRC.

In operation 812 the aggregated data associated with a third KPI is extracted from the aggregated data and analyzed using a model for the third KPI. In some embodiments, the model for the third KPI is developed using method 700. In some embodiments, the analysis is performed using machine learning system 400. In some embodiments, the third KPI is SIB. In some embodiments, the third KPI is different from SIB.

In operation 814 a determination is made regarding whether the analysis indicates that the cell is a sleeping cell based on the first KPI. In some embodiments, the determination is made using the machine learning system 400. In response to a determination that the cell is not a sleeping cell based on the first KPI, i.e., "No," the method 800 proceeds to operation 820. In response to a determination that the cell is a sleeping cell based on the first KPI, i.e., "Yes," the method 800 proceeds to operation 822.

In operation 816 a determination is made regarding whether the analysis indicates that the cell is a sleeping cell based on the second KPI. In some embodiments, the determination is made using the machine learning system 400. In response to a determination that the cell is not a sleeping cell based on the second KPI, i.e., "No," the method 800 proceeds to operation 820. In response to a determination that the cell is a sleeping cell based on the second KPI, i.e., "Yes," the method 800 proceeds to operation 822.

In operation 818 a determination is made regarding whether the analysis indicates that the cell is a sleeping cell based on the third KPI. In some embodiments, the determination is made using the machine learning system 400. In response to a determination that the cell is not a sleeping cell based on the third KPI, i.e., "No," the method 800 proceeds to operation 820. In response to a determination that the cell is a sleeping cell based on the third KPI, i.e., "Yes," the method 800 proceeds to operation 822.

In operation 820 the cell is not labeled as a sleeping cell. In some embodiments, the label of the cell is output to the network operator. In some embodiments, the label includes identifying information for the cell and the KPI which indicates that the cell is not a sleeping cell. In some embodiments, the output of the label of the cell from the operation 820 is paused until all three KPIs have been analyzed and all three KPIs indicate that the cell is not a sleeping cell.

In operation 822 the cell is labeled as a sleeping cell. In some embodiments, the label of the cell is output to the network operator. In some embodiments, the label includes identifying information for the cell and the KPI which indicates that the cell is a sleeping cell. In some embodiments, an alert, such as an audio or visual alert, is generated in operation 822.

The method 800 determines whether a cell is a sleeping cell. In some embodiments, the method 800 includes additional operations. For example, in some embodiments, the method 800 includes generating an alert or recommending maintenance in response to labeling a cell a sleeping cell. In some embodiments, at least one of the operations of method 800 is omitted. For example, in some embodiments, the operation 806 is omitted if the received testing data is already aggregated in a manner usable by the machine learning system. In some embodiments, an order of operations of the method 800 is changed. For example, in some embodiments, the operation 822 is performed prior to the operation 820. In some embodiments, prior to executing method 800 the machine learning system checks to determine whether a cell to be analyzed is already labeled a sleeping cell. In response to a determination that the cell is already labeled as a sleeping cell, that cell is not analyzed. In some embodiments, method 800 is performed simultaneously for multiple KPIs on multiple machine learning systems.

Using method 800 a determination is made for whether a cell is a sleeping cell. In some embodiments that use the machine learning system, a sleeping cell is identified more efficiently than in other approaches. As a result, the network operator is able to increase customer satisfaction with the mobile network and generate more revenue.

Figure 9:
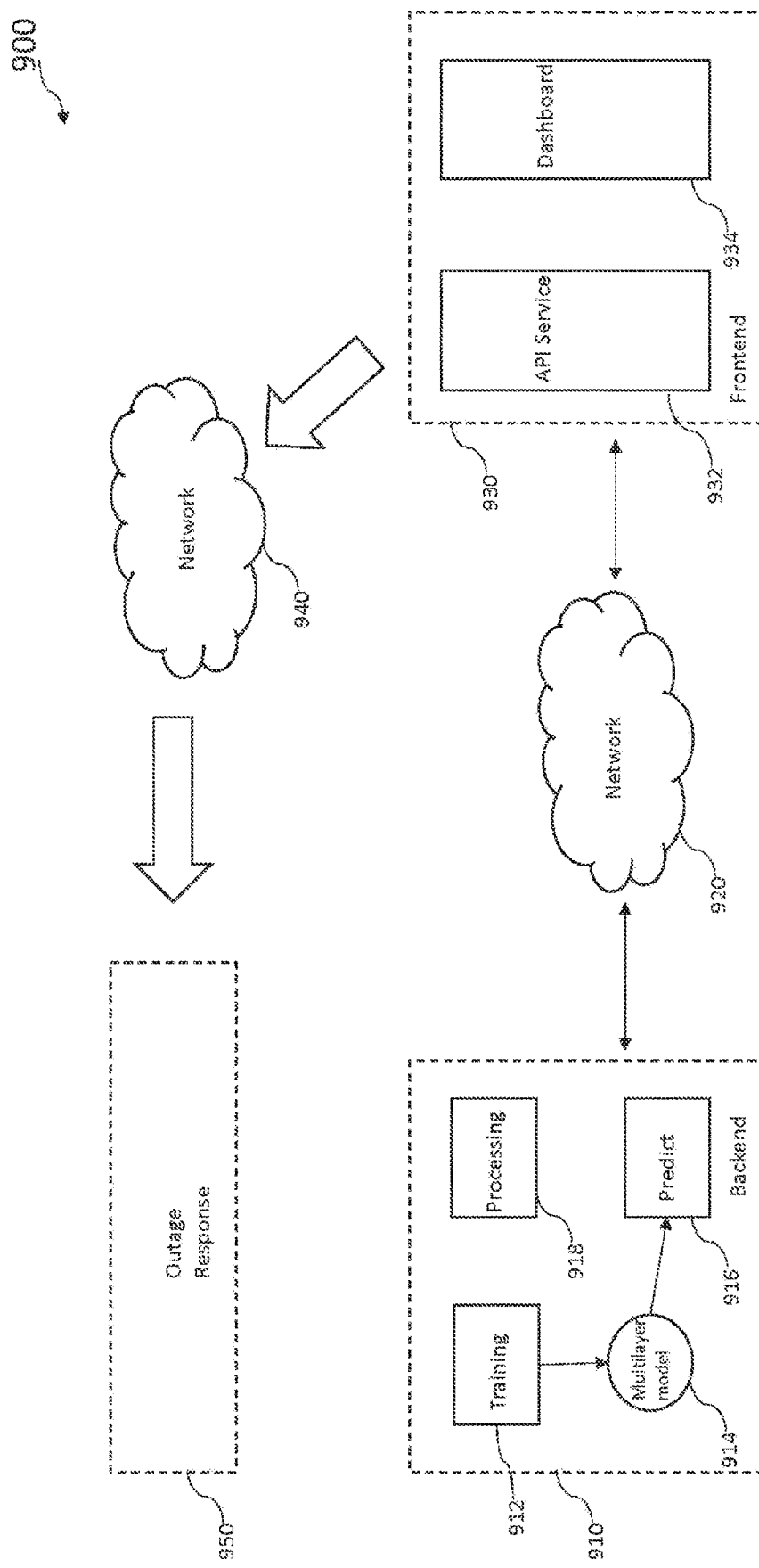
FIG. 9 is a schematic diagram of a sleeping cell monitoring system in accordance with some embodiments.

Once a cell has been identified as a sleeping cell, the network operator is alerted to the sleeping cell. In order to troubleshoot the sleeping cell or dispatch a maintenance crew, the identity of the cell is provided to the network operator as a cell ID or a site ID. In some embodiments, the identity of the cell is provided with a detection date and/or time of the cell being a sleeping cell. In some instances, the KPI or KPIs that indicate that the cell is sleeping are also provided to the network operator. This information permits not only correction of the problem with the cell but tracking of the performance of the cell to identify whether the cell is repeatedly experiencing problems identifiable by a same KPI. In some embodiments, the network operator is alerted through an API portal. In some embodiments, a dashboard is provided for the network operator FIG. 9 is a schematic diagram of a sleeping cell monitoring system 900 in accordance with some embodiments. The sleeping cell monitoring system 900 includes backend services 910. The backend services 910 include a model training unit 912. The model training unit 912 includes a memory and at least one processor for developing a model for each KPI to be analyzed when determining whether a cell is a sleeping cell. In some embodiments, the model training unit 912 executes the method 500 or the method 700.

The information generated by the model training unit 912 is transferred to a multilayer model unit 914. The multilayer model unit 914 includes a memory and at least one processor for implementing an algorithm for determining whether a cell is a sleeping cell. In some embodiments, the multilayer model unit 914 includes machine learning system 400. In some embodiments, the multilayer model unit 914 is combined with the model training unit 912 into a single device. In some embodiments, the multilayer model unit 914 and the model training unit 912 are separate devices.

An output of the multilayer model unit 914 is transferred to a model prediction unit 916. The model prediction unit 916 includes a memory and at least one processor for labelling a cell as a sleeping cell or not a sleeping cell based on the output from the multilayer model 914. In some embodiments, the model prediction unit 916 includes machine learning system 400. In some embodiments, the model prediction unit 916 is combined with at least one of the multilayer model unit 914 or the model training unit 912 into a single device. In some embodiments, each of the model prediction unit 916, the multilayer model unit 914 and the model training unit 912 are separate devices.

A data processing unit 918 is also included in the backend services 910. The data processing unit 918 includes a memory and at least one processor for receiving information from an eNB, e.g., eNB 120, and processing the data for analysis. In some embodiments, the data processing unit 918 executes the method 200 or the method 300. In some embodiments, the data processing unit 918 is combined with at least one of the model prediction unit 916, the multilayer model unit 914 or the model training unit 912 into a single device. In some embodiments, each of the data processing unit 918, the model prediction unit 916, the multilayer model unit 914 and the model training unit 912 are separate devices.

Information generated by the backend services 910 is shared with front end services 930 through a network 920. In some embodiments, the network 920 is a wireless network. In some embodiments, the network 920 includes a wired connection between the backend services 910 and the frontend services 930.

The frontend services 930 includes an API service 932 for receiving and processing the information from the backend services 910. The API service 932 is executed by a system, which includes a memory and at least one processor. In some embodiments, the API service 932 is a web-based service. In some embodiments, the API services 932 provides authentication for accessing the information from the backend services 910.

The frontend services 930 further includes a dashboard 934 for providing a graphical user interface (GUI) for the network operator, i.e., the user. The dashboard 934 is generated by a system including a memory and at least one processor. In some embodiments, the dashboard 934 is web-based. In some embodiments, the dashboard 934 is designed to be executed on a local hard drive or on a local server. The dashboard 934 provides the network operator with information related to cell identify, cell status (sleeping or not sleeping), KPI information, as well as alerts. In some embodiments, the alerts include information related sleeping cells. In some embodiments, the alerts include information related to cells that are performing improperly but are not sleeping cells. In some embodiments, the dashboard 934 includes recommendations for troubleshooting or dispatching maintenance crews to address problems with cells in the mobile network. In some embodiments, the API service 932 is combined with the dashboard 934 into a single device. In some embodiments, the API service 932 and the dashboard 934 are on separate devices.

The information from the frontend services 930 is communicated to an outage response 950 through network 940. In some embodiments, the network 940 is a wireless network. In some embodiments, the network 940 includes a wired connection between the outage response 950 and the frontend services 930. In some embodiments, the network 940 is the same as the network 920. In some embodiments, the network 940 is different from the network 920.

The outage response 950 is used to fix identified sleeping cells. In some embodiments, the outage response 950 includes a maintenance crew which is dispatched based on communication from the frontend services 930. In some embodiments, the outage response 950 is a command sent to the sleeping cell from the frontend services 950. In some embodiments, the command includes troubleshooting, such as a reboot signal or a request to reset a component of the sleeping cell.

Using the sleeping cell monitoring system 900, the network operator is able to identify sleeping cells within the mobile network. The network operator is then able to troubleshoot sleeping cells or dispatch maintenance crews to the sleeping cells in order to return the cell to proper performance. By utilizing the above described methods and machine learning system, in some embodiments, the sleeping cell monitoring system 900 is able to identify sleeping cells and correct the performance of the sleeping cells quicker than other approaches. As a result, customer satisfaction and revenues for the network operator increase.

Figure 10:
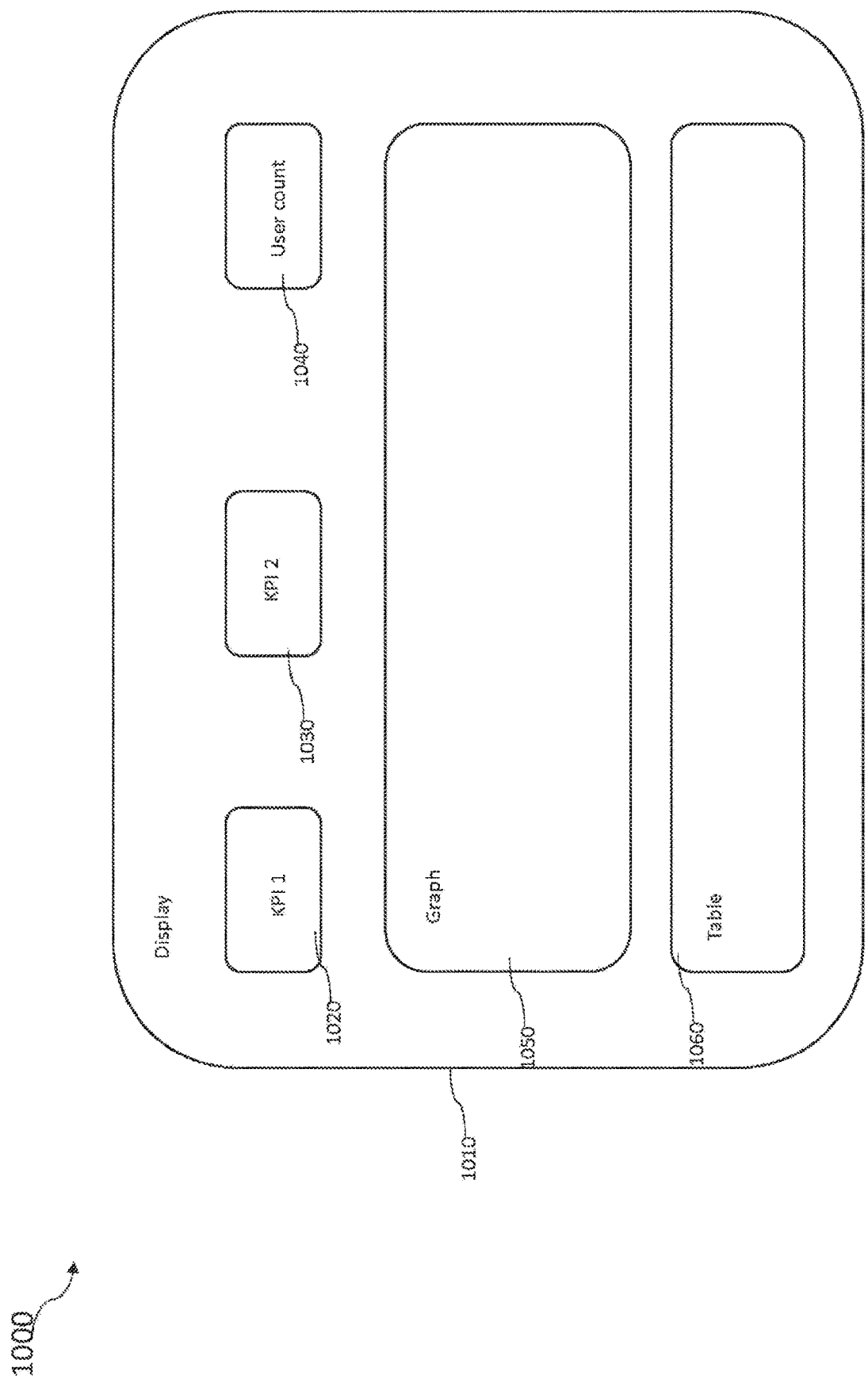
FIG. 10 is a view of a graphical user interface for a dashboard for a sleeping cell monitoring system in accordance with some embodiments.

FIG. 10 is a view of a graphical user interface (GUI) 1000 for a dashboard for a sleeping cell monitoring system in accordance with some embodiments. The GUI 1000 is an example of the dashboard 934. One of ordinary skill in the art would recognize that the dashboard 934 is able to include variations on GUI 1000. One of ordinary skill in the art would also recognize that the selection of information displayed on the GUI 1000 is merely exemplary and additional information is able to be included in the GUI 1000 or elements of the GUI 1000 are able to be omitted. One of ordinary skill in the art would also recognize that the placement of information in the GUI 1000 is merely exemplary and variations are possible. In some embodiments, the GUI 1000 further includes additional fields, such as troubleshooting options for fixing performance of a sleeping cell.

The GUI 1000 includes a display region 1020 for a first KPI. The display region 1020 displays the first KPI. In some embodiments, the display region 1020 includes a drop-down menu permitting selection of the first KPI from a list of KPIs. In some embodiments, the display region 1020 includes an editable field where the KPI is entered. In some embodiments, the GUI 1000 highlights information in a table 1060 or a graph 1050 based on the KPI in the display region 1020.

The GUI 1000 includes a display region 1030 for a second KPI. The display region 1030 displays the second KPI. In some embodiments, the display region 1030 includes a drop-down menu permitting selection of the second KPI from a list of KPIs. In some embodiments, the display region 1030 includes an editable field where the KPI is entered. In some embodiments, the GUI 1000 highlights information in the table 1060 or the graph 1050 based on the KPI in the display region 1030.

The GUI 1000 includes a display region 1040 for a user count. The user count indicates the number of users connected to the mobile network. In some embodiments, the user count in the display region 1040 is modified based on the selection of a cell or group of cells from the table 1060.

The GUI 1000 includes the graph 1050. The graph 1050 provides a visual representation of information related to the performance of the mobile network. In some embodiments, the graph 1050 includes changes in the first KPI or the second KPI over time. In some embodiments, the graph 1050 includes changes in the user count over time. In some embodiments, the graph 1050 displays the performance history of a cell selected form the table 1060.

The GUI 1000 includes the table 1060. The table 1060 includes information for a number of cells. The information includes cell identifying information and location. In some embodiments, the information includes a value of the first KPI or the second KPI. In some embodiments, the information includes the user count for the users connected to the cell. In some embodiments, the table 1060 permits selection of a cell. In some embodiments, a sleeping cell in the table 1060 is highlighted.

FIG. 11 is a schematic diagram of a system 1100 for implementing detection or monitoring of a sleeping cell in accordance with some embodiments. In some embodiments, system 1100 is usable to execute any of the methods 200, 300, 500, 600, 700 or 800. In some embodiments, the system 1100 is usable to implement any of the systems 100, 400 or 900. System 1100 includes a hardware processor 11002 and a non-transitory, computer readable storage medium 1104 encoded with, i.e., storing, the computer program code 1106, i.e., a set of executable instructions. Computer readable storage medium 1104 is also encoded with instructions 1107 for interfacing with external components. The processor 1102 is electrically coupled to the computer readable storage medium 1104 via a bus 1108. The processor 1102 is also electrically coupled to an I/O interface 1110 by bus 1108. A network interface 1112 is also electrically connected to the processor 1102 via bus 1108. Network interface 1112 is connected to a network 1114, so that processor 1102 and computer readable storage medium 1104 are capable of connecting to external elements via network 1114. The processor 1102 is configured to execute the computer program code 1106 encoded in the computer readable storage medium 1104 in order to cause system 1100 to be usable for performing a portion or all of the operations as described in any of methods 200, 300, 500, 600, 700 or 800. The processor 1102 is configured to execute the computer program code 1106 encoded in the computer readable storage medium 1104 in order to cause system 1100 to be usable for performing a portion or all of the operations associated with any of systems 100, 400 or 900.

In some embodiments, the processor 1102 is a central processing unit (CPU), a multi-processor, a distributed processing system, an application specific integrated circuit (ASIC), and/or a suitable processing unit.

In some embodiments, the computer readable storage medium 1104 is an electronic, magnetic, optical, electromagnetic, infrared, and/or a semiconductor system (or apparatus or device). For example, the computer readable storage medium 1104 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1104 includes a compact disk-read only memory (CD-ROM), a compact disk-read/write (CD-R/W), and/or a digital video disc (DVD).

In some embodiments, the storage medium 1104 stores the computer program code 506 configured to cause system 1100 to perform any of methods 200, 300, 500, 600, 700 or 800. In some embodiments, the storage medium 1104 also stores information needed for performing any of methods 200, 300, 500, 600, 700 or 800 as well as information generated during performing any of methods 200, 300, 500, 600, 700 or 800.

In some embodiments, the storage medium 1104 stores instructions 1107 for interfacing with external devices. The instructions 1107 enable processor 1102 to generate and receive instructions readable by the external devices to effectively implement any of methods 200, 300, 500, 600, 700 or 800.

System 1100 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1102.

System 1100 also includes network interface 1112 coupled to the processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interface such as ETHERNET, USB, or IEEE-1394. In some embodiments, any of methods 200, 300, 500, 600, 700 or 800 is implemented in two or more systems 1100, and information is exchanged between different systems 1100 via network 1114.

An aspect of this description relates to a method. The method includes collecting data related to a first key performance indicator (KPI) for a cell in a mobile network. The method further includes aggregating the collected data for the first KPI into a plurality of groups, wherein a first group of the plurality of groups comprises values of the first KPI during a time period in a first day, a second group of the plurality of groups comprises values of the first KPI during the time period in a second day preceding the first day, and a third group of the plurality of groups comprises values of the first KPI during the time period in a third day preceding the second day. The method further includes determining whether the cell is a sleeping cell based on a comparison of the first group, the second group and the third group. The method further includes labelling the cell as sleeping in response to a determination that the cell is the sleeping cell. In some embodiments, collecting the data related to the first KPI includes collecting data related to zero radio resource control (Zero RRC), cyclic redundancy check (CRC), or system information block (SIB). In some embodiments, aggregating the collected data includes setting the second day to be a day immediately preceding the first day. In some embodiments, aggregating the collected data includes setting the third day to be a day one week prior to the first day. In some embodiments, the method further includes collecting data related to a second KPI, different from the first KPI, from the cell in response to a determination that the cell is not the sleeping cell; aggregating the collected data for the second KPI; and determining whether the cell is the sleeping cell based on the aggregated data for the second KPI. In some embodiments, the method further includes collecting data related to a third KPI, different from the first KPI and the second KPI, from the cell in response to a determination that the cell is not the sleeping cell; aggregating the collected data for the third KPI; and determining whether the cell is the sleeping cell based on the aggregated data for the third KPI. In some embodiments, collecting the data related to the first KPI includes collecting data related to Zero RRC, collecting data related to the second KPI comprises collecting data related to CRC, collecting data related to the third KPI comprises collecting data related to SIB. In some embodiments, determining whether the cell is the sleeping cell includes using a machine learning system. In some embodiments, the method further includes alerting a network operator in response to labelling the cell as sleeping.

An aspect of this description relates to a method. The method includes training a machine learning system to develop a model for a first key performance indicator (KPI) for a cell in a mobile network. The method further includes receiving data related to the first KPI. The method further includes determining, using the machine learning system, whether the cell is a sleeping cell based on a comparison between the received data related to the first KPI and the model for the first KPI. The method further includes labelling the cell as sleeping in response to a determination that the cell is the sleeping cell. In some embodiments, training the machine learning system includes calculating a linear loss for an encoder in the machine learning system; and calculating a non-linear loss for the encoder in the machine learning system. In some embodiments, the method further includes training the machine learning system to develop a model for a second KPI for the cell; receiving data related to the second KPI; and determining, using the machine learning system, whether the cell is the sleeping cell based on a comparison between the received data related to the second KPI and the model for the second KPI. In some embodiments, receiving data related to the first KPI includes receiving data related to zero radio resource control (Zero RRC), cyclic redundancy check (CRC), or system information block (SIB). In some embodiments, training the machine learning system to develop the model for the second KPI includes training the machine learning system to develop the model for the second KPI after training the machine learning system to develop the model for the first KPI. In some embodiments, the method further includes determining whether the cell has a detectable fault. In some embodiments, the method further includes labelling the cell as not sleeping in response to determining that the cell has a detectable fault. In some embodiments, the method further includes aggregating the received data for the first KPI into a plurality of groups, wherein a first group of the plurality of groups comprises values of the first KPI during a time period in a first day, a second group of the plurality of groups comprises values of the first KPI during the time period in a second day preceding the first day, and a third group of the plurality of groups comprises values of the first KPI during the time period in a third day preceding the second day. In some embodiments, the method further includes alerting a network operator in response to labelling the cell as sleeping.

An aspect of this description relates to a system. The system includes a non-transitory computer readable medium configured to store instructions. The system further includes a processor connected to the non-transitory computer readable medium. The processor is configured to execute the instructions for developing a model for a first key performance indicator (KPI) for a cell in a mobile network. The processor is configured to execute the instructions for receiving data related to the first KPI. The processor is configured to execute the instructions for determining whether the cell is a sleeping cell based on a comparison between the received data related to the first KPI and the model for the first KPI. The processor is configured to execute the instructions for labelling the cell as sleeping in response to a determination that the cell is the sleeping cell. In some embodiments, the first KPI includes zero radio resource control (Zero RRC), cyclic redundancy check (CRC), or system information block (SIB).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method comprising:
 collecting data related to a first key performance indicator (KPI) for a cell in a mobile network;
 aggregating the collected data for the first KPI into a plurality of groups, wherein a first group of the plurality of groups comprises values of the first KPI during a time period in a first day, a second group of the plurality of groups comprises values of the first KPI during the time period in a second day preceding the first day, and a third group of the plurality of groups comprises values of the first KPI during the time period in a third day preceding the second day;
 determining whether the cell is a sleeping cell based on a comparison of the first group, the second group and the third group; and
 labelling the cell as sleeping in response to a determination that the cell is the sleeping cell.

2. The method of claim 1, wherein collecting the data related to the first KPI comprises collecting data related to zero radio resource control (Zero RRC), cyclic redundancy check (CRC), or system information block (SIB).

3. The method of claim 1, wherein aggregating the collected data comprises setting the second day to be a day immediately preceding the first day.

4. The method of claim 3, wherein aggregating the collected data comprises setting the third day to be a day one week prior to the first day.

5. The method of claim 1, further comprising:
 collecting data related to a second KPI, different from the first KPI, from the cell in response to a determination that the cell is not the sleeping cell;
 aggregating the collected data for the second KPI; and
 determining whether the cell is the sleeping cell based on the aggregated data for the second KPI.

6. The method of claim 5, further comprising:
 collecting data related to a third KPI, different from the first KPI and the second KPI, from the cell in response to a determination that the cell is not the sleeping cell;
 aggregating the collected data for the third KPI; and
 determining whether the cell is the sleeping cell based on the aggregated data for the third KPI.

7. The method of claim 6, wherein colleting the data related to the first KPI comprises collecting data related to Zero RRC, collecting data related to the second KPI comprises collecting data related to CRC, collecting data related to the third KPI comprises collecting data related to SIB.

8. The method of claim 1, wherein determining whether the cell is the sleeping cell comprises using a machine learning system.

9. The method of claim 1, further comprising alerting a network operator in response to labelling the cell as sleeping.

* * * * *